United States Patent
Suwa et al.

(10) Patent No.: US 7,254,819 B2
(45) Date of Patent: Aug. 7, 2007

(54) RECORDING MEDIUM DRIVE UNIT

(75) Inventors: Kaname Suwa, Yokohama (JP); Masahiro Ando, Yokohama (JP); Mamoru Takahashi, Murayama (JP); Naoki Tamiya, Sagae (JP); Yoshiaki Aboshi, Tendo (JP)

(73) Assignees: Mitsumi Electric Co., Ltd., Tokyo (JP); Canon Kabushiki Kaisha, Tokyo (JP)

( * ) Notice: Subject to any disclaimer, the term of this patent is extended or adjusted under 35 U.S.C. 154(b) by 434 days.

(21) Appl. No.: 10/783,551

(22) Filed: Feb. 20, 2004

(65) Prior Publication Data
US 2004/0233575 A1 Nov. 25, 2004

(30) Foreign Application Priority Data
May 20, 2003 (JP) ............... 2003-142618

(51) Int. Cl.
*G11B 17/04* (2006.01)
*G06K 17/00* (2006.01)
*G06K 13/06* (2006.01)

(52) U.S. Cl. .................... 720/632; 360/99.06; 439/153

(58) Field of Classification Search ........ 720/619–625, 720/615, 616, 630, 632, 634, 647, 656; 439/153, 439/157, 325, 329, 630; 360/99.06, 99.07, 360/99.02, 99.03; 235/492, 487
See application file for complete search history.

(56) References Cited
U.S. PATENT DOCUMENTS

| | | | | |
|---|---|---|---|---|
| 4,979,160 A | * | 12/1990 | Araki | ........................ 720/621 |
| 6,167,015 A | * | 12/2000 | Jeong | ......................... 720/623 |
| 6,314,073 B2 | * | 11/2001 | Horie | .......................... 720/628 |
| 6,385,004 B1 | * | 5/2002 | Sanpei et al. | .............. 360/96.5 |
| 6,473,382 B1 | * | 10/2002 | Tagawa et al. | ............. 720/616 |
| 6,512,731 B1 | * | 1/2003 | Seo et al. | ................... 720/656 |
| 6,592,041 B1 | * | 7/2003 | Hanzawa | .................... 235/486 |
| 7,125,271 B2 | * | 10/2006 | Hanzawa, deceased et al. | ............ 439/159 |
| 2003/0073350 A1 | | 4/2003 | Shimada | |

FOREIGN PATENT DOCUMENTS

| | | | | |
|---|---|---|---|---|
| EP | 1079323 A2 | * | 2/2001 | |
| JP | 07006462 A | * | 1/1995 | |
| JP | 07073554 A | * | 3/1995 | |
| JP | 08293008 A | * | 11/1996 | |
| JP | 10-314217 | | 2/1998 | |
| JP | 11312348 A | * | 11/1999 | |
| JP | 2001060253 A | * | 3/2001 | |
| JP | 2001-236751 | | 8/2001 | |
| JP | 2002049896 A | * | 2/2002 | |
| JP | 2002298979 A | * | 10/2002 | |
| JP | 2003045560 A | * | 2/2003 | |
| WO | WO 9632694 A1 | * | 10/1996 | |

* cited by examiner

*Primary Examiner*—William J Klimowicz
(74) *Attorney, Agent, or Firm*—Ladas & Parry LLP

(57) ABSTRACT

A recording medium drive unit includes an insertion opening through which a recording medium is inserted, a holder receiving the recording medium inserted through the insertion opening, a connector, a holder drive part moving the holder to a loading position so that the recording medium is connected to the connector, and a clamp mechanism pressing opposing sides of the recording medium when the recording medium is inserted into the holder. The clamp mechanism is provided to a side of the holder so as to be slidable thereon, and holds the recording medium by the opposing sides thereof.

12 Claims, 23 Drawing Sheets

FIG.1C
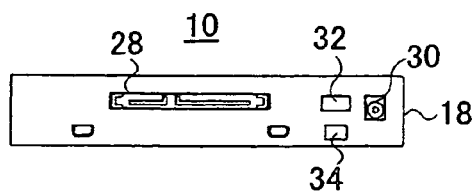
FIG.1D          FIG.1B          FIG.1E
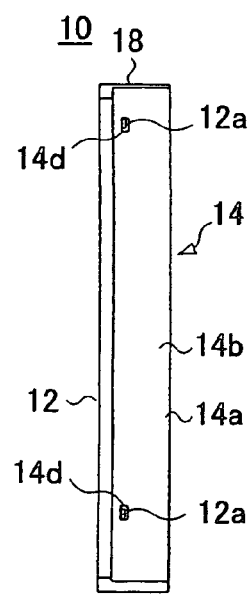 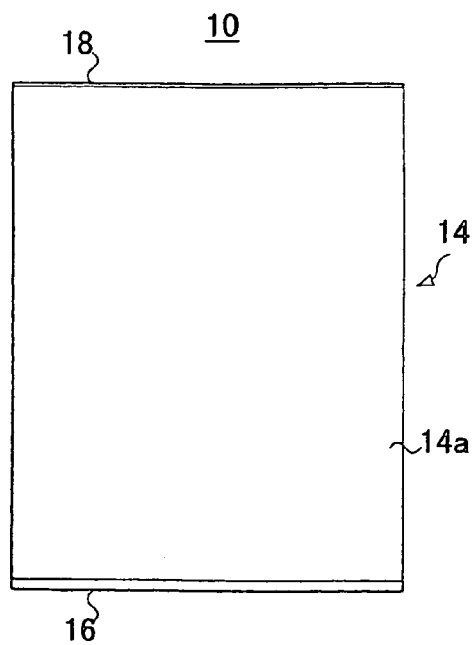 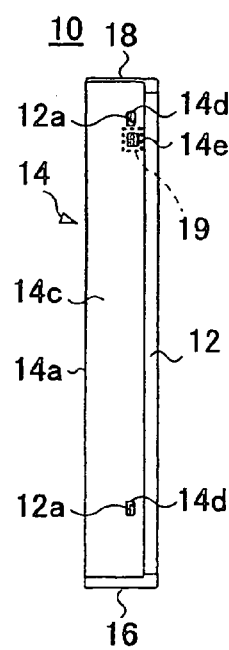
FIG.1A
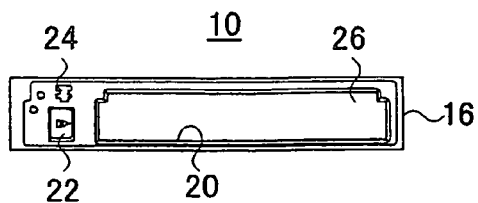

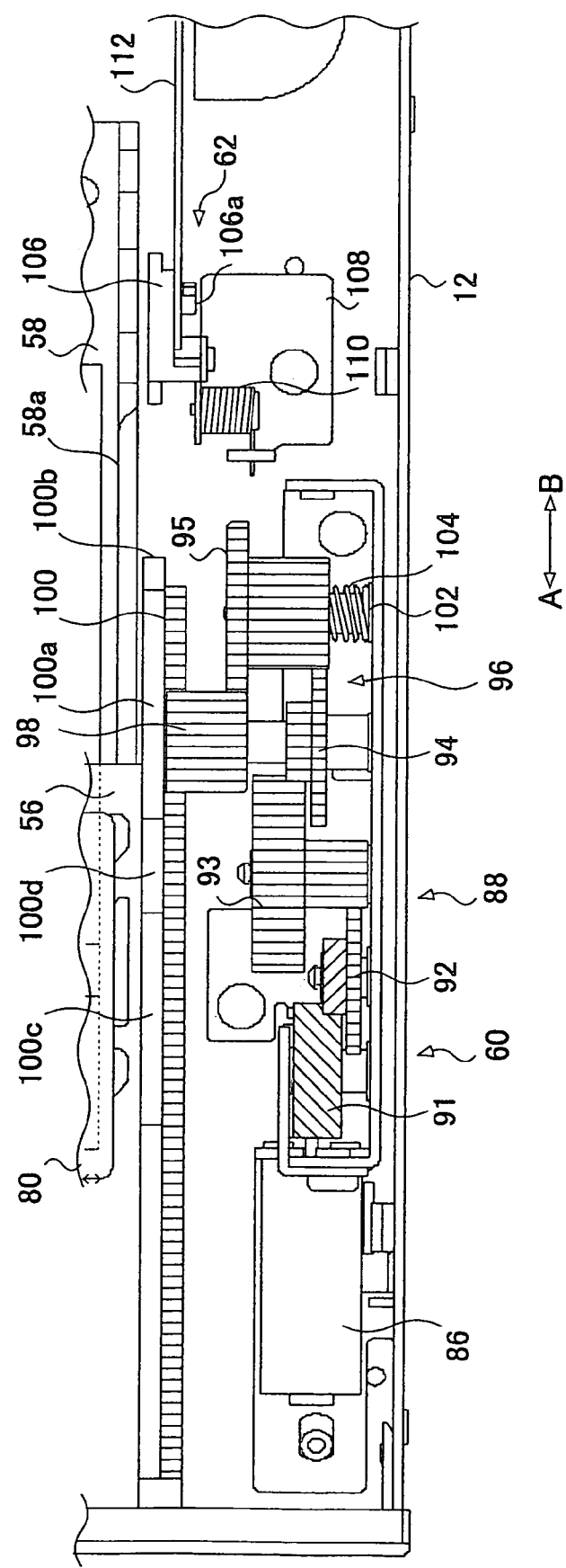

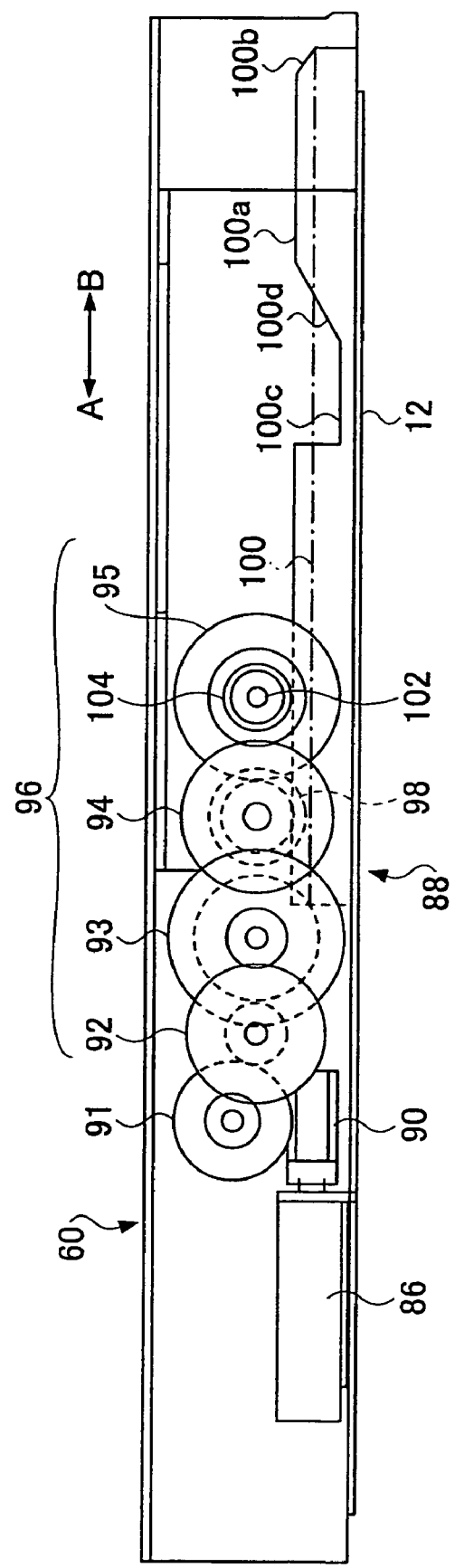

RECORDING MEDIUM DRIVE UNIT

BACKGROUND OF THE INVENTION

1. Field of the Invention

The present invention relates generally to recording medium drive units, and more particularly to a recording medium drive unit configured to automatically draw a recording medium inside when the recording medium is inserted through an insertion opening in a front panel.

2. Description of the Related Art

There has been provided a recording medium drive unit housed in an electronic apparatus such as a personal computer so that a recording medium can be inserted into and extracted from the recording medium drive unit. Japanese Laid-Open Patent Application No. 2001-236751 discloses such a recording medium drive unit.

This type of recording medium drive unit facilitates data management or data movement by selectively causing a recording medium on which data is recorded to be inserted into or extracted from the recording medium drive unit.

On the other hand, the recording medium is formed of a cartridge of a predetermined size and shape containing a recording medium such as a magnetic disk. A recording method and storage capacity are also standardized. It has been studied to increase storage capacity by, for instance, increasing the diameter of a magnetic disk by enlarging the outside shape of the recording medium.

In this case, in order to ensure compatibility with an already employed recording medium, it has been studied to increase the depth of the recording medium while making the width and a connector common to both recording media.

In the case of configuring the recording medium drive unit so that recording media of different sizes are loadable thereinto, it is desired that the drive unit allow smooth loading of any type of recording medium irrespective of the difference in size between recording media.

Further, in the case of connecting a recording medium inserted into the drive unit to the internal connector thereof, it is desired that the connection be made smoothly. In this case, it is also desired that a holder be driven to stop at an ejection position so that a recording medium of a great depth is prevented from falling off the holder and the rear end of a recording medium of a small depth is ejected to a position where the recording medium is extractable through an insertion opening.

SUMMARY OF THE INVENTION

Accordingly, it is a general object of the present invention to provide a recording medium drive unit in which the above-described disadvantages are eliminated.

A more specific object of the present invention is to provide a recording medium drive unit that can smoothly load a recording medium irrespective of its size and ensure connection of the recording medium with the internal connector of the drive unit.

Another more specific object of the present invention is to provide a recording medium drive unit that can smoothly eject a recording medium irrespective of its depth.

One or more of the above objects of the present invention are achieved by a recording medium drive unit, including: an insertion opening through which a recording medium is inserted; a holder receiving the recording medium inserted through the insertion opening; a connector; a holder drive part moving the holder to a loading position so that the recording medium is connected to the connector; and a clamp mechanism pressing opposing sides of the recording medium when the recording medium is inserted into the holder, the clamp mechanism being provided to a side of the holder so as to be slidable thereon, wherein the clamp mechanism holds the recording medium by the opposing sides thereof.

According to the above-described recording medium drive unit, the clamp mechanisms hold the recording medium inside the holder by both its right and left sides (side surfaces). Accordingly, it is ensured that the recording medium inserted into the holder is held by clamping from both sides. As a result, any types of recording media can be loaded smoothly irrespective of their differences in size and be connected to the connector inside the drive unit with high reliability.

One or more of the above objects of the present invention are also achieved by a recording medium drive unit, including: an insertion opening through which a recording medium is inserted; a holder receiving the recording medium inserted through the insertion opening; a holder drive part moving the holder to a loading position or an initial position, wherein: the holder is adapted to selectively receive, as the recording medium, each of a plurality of recording media having different sizes along an insertion direction in which the recording medium is inserted into the holder, and to have the recording medium attached to or detached from the holder substantially horizontally with respect to the holder; and when the holder is driven to the initial position by the holder drive part and ejects the recording medium to be in a stationary state, at least an end of the recording medium in an ejection direction opposite to the insertion direction is positioned to project from the insertion opening if the recording medium is one having the smallest size, and the recording medium projects from the insertion opening with such an amount of projection as to prevent the recording medium from falling off the holder if the recording medium is one having the largest size.

According to the above-described recording medium drive unit, a recording medium can be smoothly ejected irrespective of its depth (size along the insertion direction).

BRIEF DESCRIPTION OF THE DRAWINGS

Other objects, features and advantages of the present invention will become more apparent from the following detailed description when read in conjunction with the accompanying drawings, in which:

FIGS. 1A through 1E are a front view, a plan view, a rear view, a left side view, and a right side view, respectively, of a recording medium drive unit according to an embodiment of the present invention;

FIG. 8 is an enlarged plan view of part of a holder drive mechanism of the recording medium drive unit according to the embodiment of the present invention;

FIG. 9 is a left side view of the holder drive mechanism according to the embodiment of the present invention;

DETAILED DESCRIPTION OF THE PREFERRED EMBODIMENTS

Figure 2C:
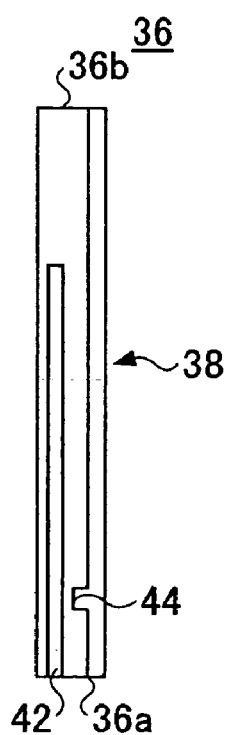
FIGS. 2A through 2C are a plan view, a front view, and a side view, respectively, of a first recording medium according to the embodiment of the present invention.

A description is given below, with reference to the accompanying drawings, of an embodiment of the present invention.

FIGS. 1A through 1E are a front view, a plan view, a rear view, a left side view, and a right side view, respectively, of a recording medium drive unit 10 according to the embodiment of the present invention.

Referring to FIGS. 1A through 1E, the recording medium drive unit 10 includes a box-like chassis 12, a cover 14 attached to the upper part of the chassis 12, and a front panel 16 attached to the front side of the chassis 12. Further, a rear panel 18 is attached to the rear part of the chassis 12.

The cover 14 includes a top plate 14a covering the upper side of the chassis 12 and side plates 14b and 14c covering left and right sides 12c and 12d (FIG. 6), respectively, of the chassis 12. Two engagement holes 14d that fit with and engage projections 12a of the chassis 12 are provided to each of the side plates 14b and 14c. Further, an opening 14e opposing the strip part of a removable detection switch 19 (indicated by a broken line in FIG. 1E) is provided to the right side plate 14c.

To the front panel 16, an insertion opening 20 through which a recording medium (described below) is inserted, an eject button 22, and an emergency opening 24 are provided. The insertion opening 20 is opened and closed by a lid member 26 provided rotatably inside the insertion opening 20.

To the rear panel 18, an input/output connector 28 connected to an external connector (not graphically represented), a power supply plug 30, a USB (universal serial bus) connector 32, and a lock opening 34 are provided.

A description is given next of the shapes of recording media applied in this embodiment. In this embodiment, two types of recording media including built-in hard disks of different storage capacities are assumed. Further, in this embodiment, a "recording medium" may also refer to the assembly of a recording medium and a cartridge containing the recording medium.

Figure 2A:
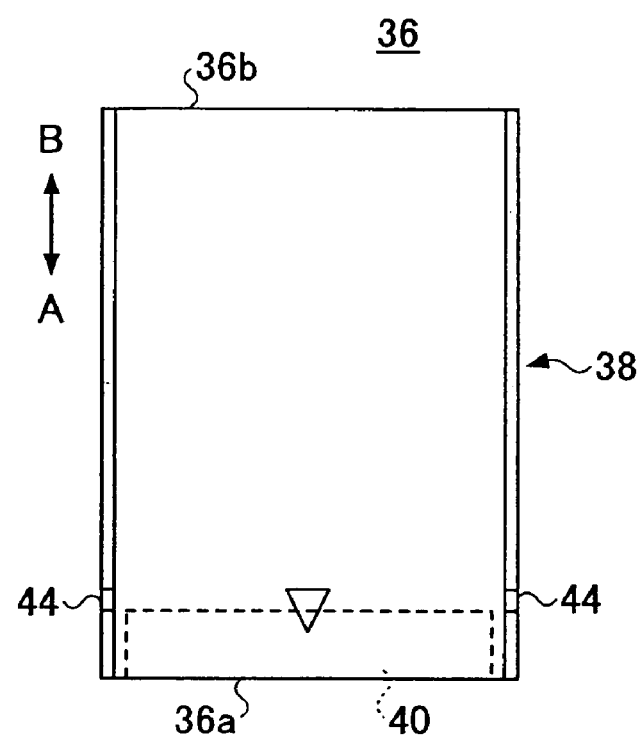
Figure 2B:
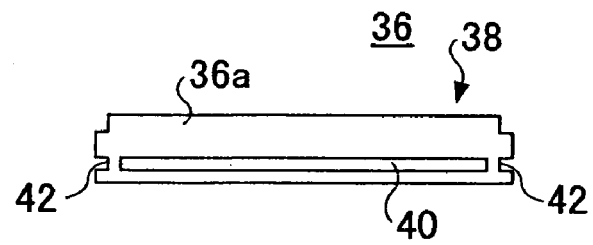

FIGS. 2A through 2C are a plan view, a front view, and a side view, respectively, of a first recording medium 36 containing a 2.5 inch disk.

Referring to FIGS. 2A through 2C, the first recording medium 36 contains a magnetic disk (not graphically represented) as a recording medium inside a resin cartridge 38. The cartridge 38 has a connector 40 provided to an insertion-side end 36a thereof. Further, the cartridge 38 includes a guide groove 42 extending in the insertion and ejection directions (indicated by arrows A and B, respectively, in FIG. 2A) and a clamp recess 44 on each of its right and left sides.

Figure 3C:
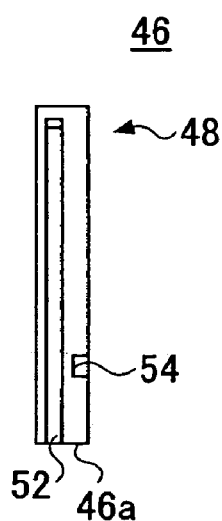
FIGS. 3A through 3C are a plan view, a front view, and a side view, respectively, of a second recording medium according to the embodiment of the present invention.
Figure 3A:
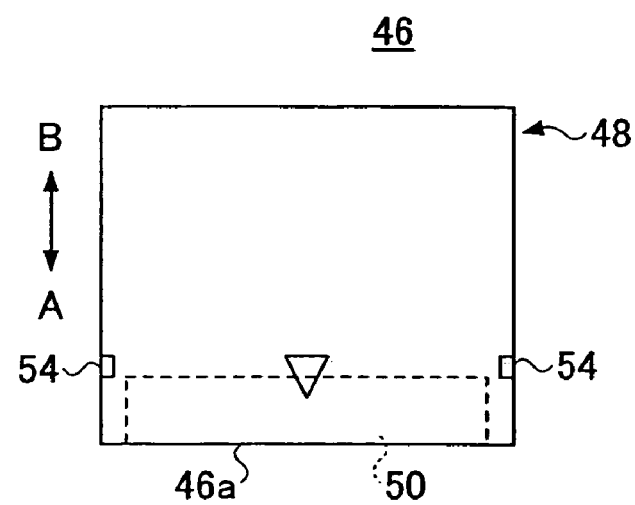
Figure 3B:
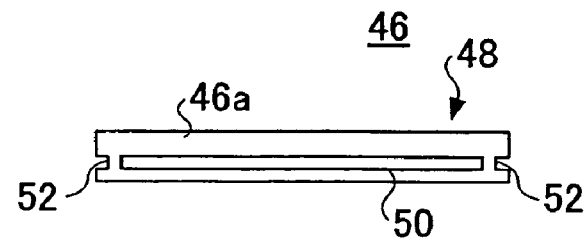

FIGS. 3A through 3C are a plan view, a front view, and a side view, respectively, of a second recording medium 46 containing a 1.8 inch disk.

Referring to FIGS. 3A through 3C, the second recording medium 46 contains a magnetic disk (not graphically represented) as a recording medium inside a resin cartridge 48.

The cartridge 48 has a connector 50 provided to an insertion-side end 46a thereof. Further, the cartridge 48 includes a guide groove 52 extending in the insertion and ejection directions (indicated by arrows A and B, respectively, in FIG. 3A) and a clamp recess 54 on each of its right and left sides.

The first and second recording media 36 and 46 have the connectors 40 and 50 common to each other. The vertical positions of the guide grooves 42 and 52 and the shapes and the positions of the clamp recesses 44 and 54 are also common to the first and second recording media 36 and 46. Further, the cartridges 38 and 48 are equal in width but different in depth. The cartridge 38 has a greater depth than the cartridge 48.

Figure 4:
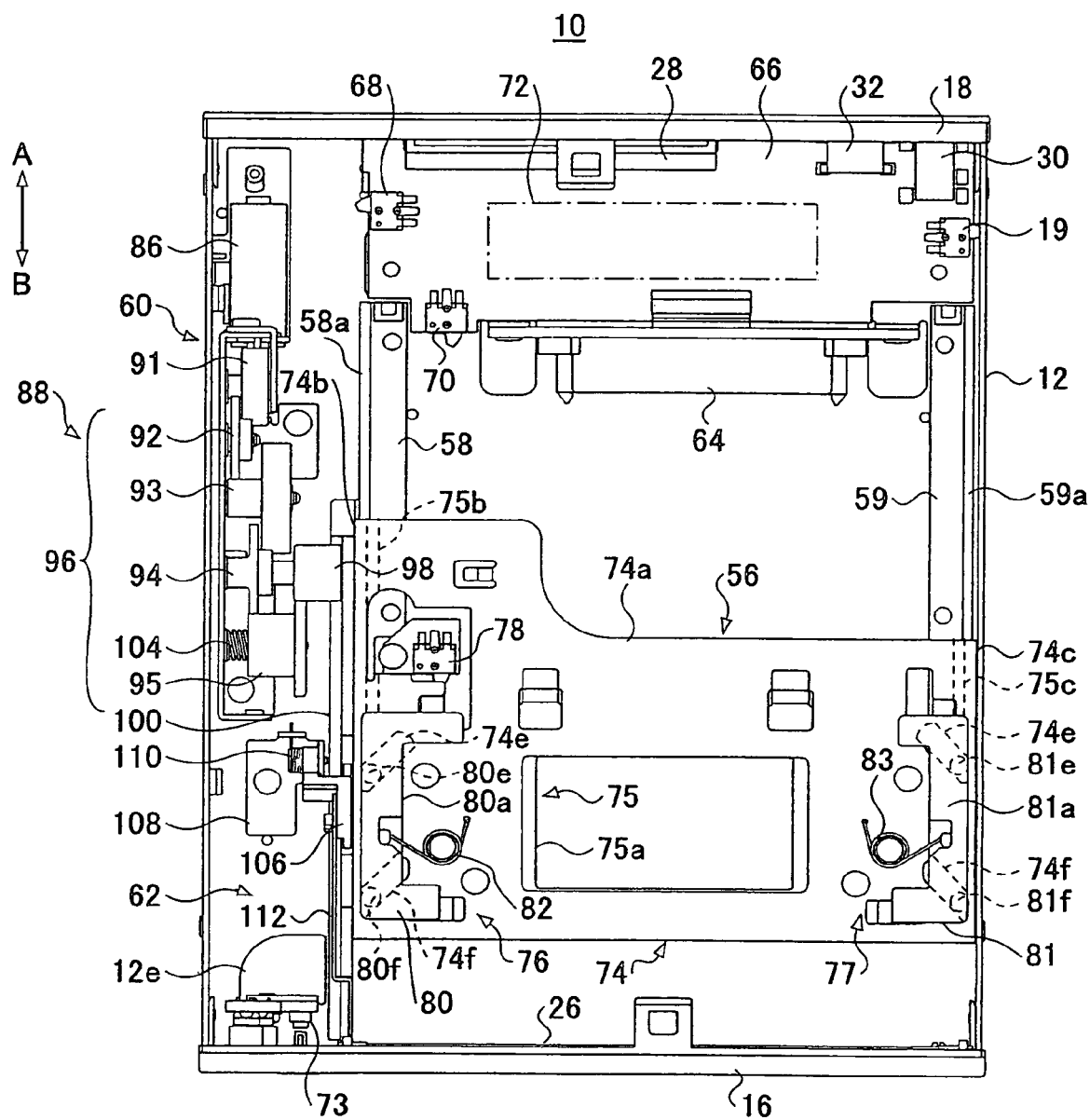
FIG. 4 is a plan view of the recording medium drive unit from which a cover is removed according to the embodiment of the present invention.
Figure 5A:
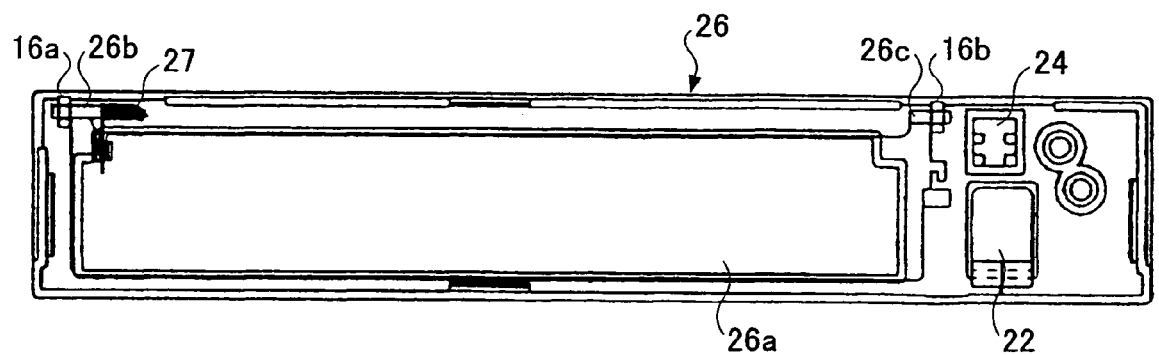
FIG. 5A is a rear view of a front panel of the recording medium drive unit.
Figure 5B:
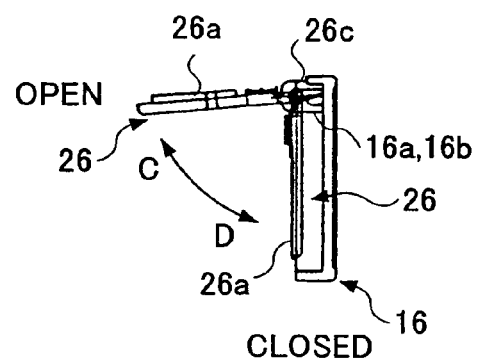
FIG. 5B is a side view of the front panel, showing the opening and closing operations of a lid member according to the embodiment of the present invention.
Figure 6:
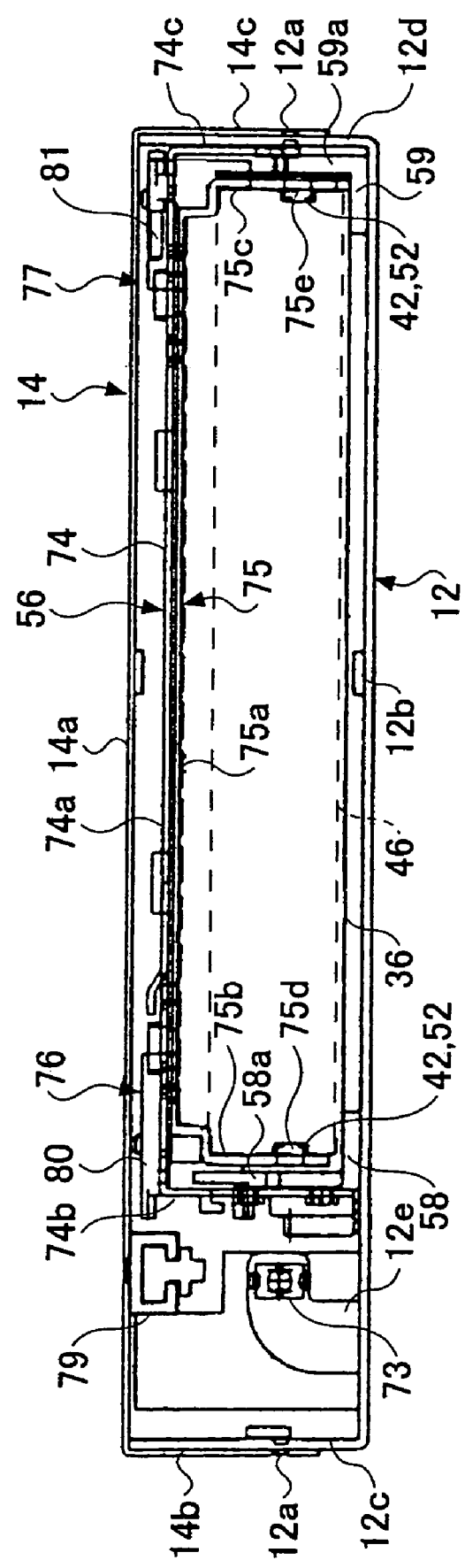
FIG. 6 is a cross-sectional view of a chassis of the recording medium drive unit without the front panel, showing the internal structure of the chassis, according to the embodiment of the present invention.
Figure 7C:
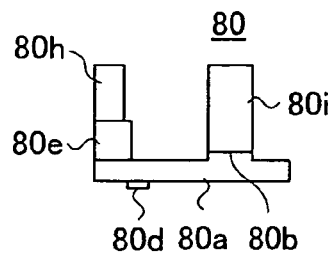
FIGS. 7A through 7E are a front view, a top plan view, a rear view, a side view, and a bottom plan view, respectively, of a slide member provided on the left side on a holder of the recording medium drive unit according to the embodiment of the present invention.
Figure 7B:
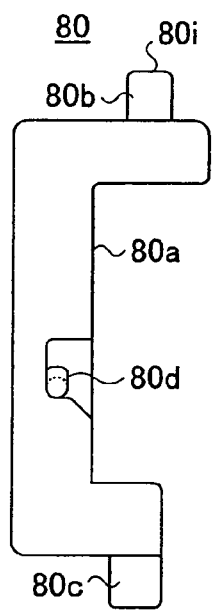
Figure 7D:
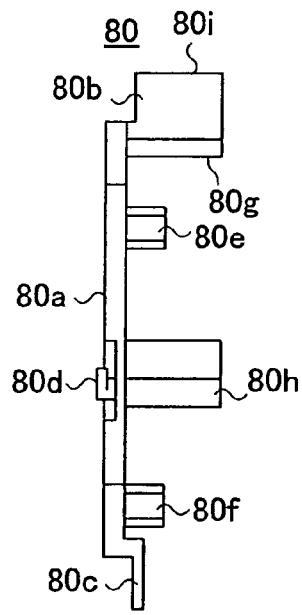
Figure 7E:
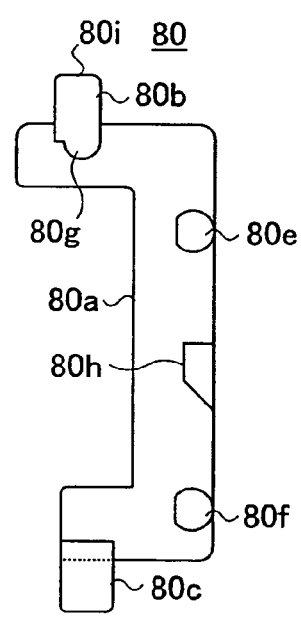
Figure 7A:
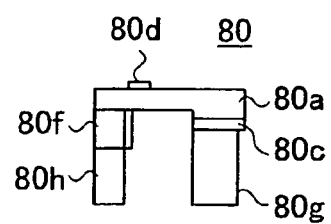

FIG. 4 is a plan view of the recording medium drive unit 10 from which the cover 14 is removed. FIG. 5A is a rear view of the front panel 16, showing its internal side. FIG. 5B is a side view of the front panel 16, showing the opening and closing operations of the lid member 26 between an open position and a closed position. FIG. 6 is a cross-sectional view of the chassis 12 without the front panel 16, showing the internal structure of the chassis 12.

As shown in FIGS. 4, 5A, and 5B, the lid member 26 opening and closing the insertion opening 20 is supported rotatably inside the panel 16. The lid member 26 includes a flap 26a opposing the insertion opening 20 and shafts 26b and 26c protruding leftward and rightward, respectively, from the ends of the upper part of the flap 26a. Further, bearing parts 16a and 16b receiving the shafts 26b and 26c, respectively, are provided on the rear (internal) surface of the front panel 16.

A torsion spring 27 is coiled around the shaft 26b so that the flap 26a is biased in the closing direction (indicated by arrow D in FIG. 5B) by the spring force of the torsion spring 27. Therefore, the recording medium 36 or 46 is inserted into the insertion opening 20 so that the insertion-side end 36a or 46a presses the flap 26a in the insertion direction (the A direction in FIG. 2A or 3A) to rotate the flap 26a in the opening direction (indicated by arrow C in FIG. 5B).

At this point, the lid member 26 is rotated in the opening direction against the spring force of the torsion spring 27 to be displaced from the insertion path of the recording medium 36 or 46, thus being prevented from hindering its insertion. In the case of the small-depth recording medium 46, as its rear portion passes the lid member 26, the lid member 26 rotates in the closing direction to close the insertion opening 20, thus preventing dust from entering inside. In the case of the large-depth recording medium 36, its loading is completed with an ejection-side end 36b thereof closing the insertion opening 20. Accordingly, the lid member 26 remains displaced from the insertion path in the open position where the lid member 26 comes into contact with the upper surface of the recording medium 36.

Referring to FIG. 4, a holder 56 into which the recording media 36 and 46 are inserted, a pair of guide members 58 and 59 guiding the holder 56 in the directions of its movements, a holder drive mechanism 60 driving the holder 56, an opening and closing mechanism 62 opening and closing the lid member 26, and a base plate 66 on which a medium connector 64 is mounted are provided on a bottom surface 12b (FIG. 6) of the chassis 12. The connectors 40 and 50 of the recording media 36 and 46 are connected to the medium connector 64.

In addition to the medium connector 64, the removable detection switch 19, the input/output connector 28, the power supply plug 30, the USB connector 32, a holder detection switch 68, a loading detection switch 70, and a control circuit 72 are provided on the base plate 66. The control circuit 72 may be composed of a microcomputer or an analog circuit.

Next, a description is given of the holder 56.

Referring to FIGS. 4 and 6, the holder 56 is movably supported by the guide members 58 and 59 standing on the bottom surface 12b of the chassis 12 at a vertical position opposite the insertion opening 20 of the front panel 16. The recording medium 36 or 46 passing the insertion opening 20 is inserted into the holder 56.

First and second sliding members 74 and 75 each formed by processing plate metal bent into an angular C-letter shape are unitarily combined into the holder 56. The first sliding member 74 provided outside the second sliding member 75 includes a top plate 74a and side plates 74b and 74c. The top plate 74a is formed to extend between the upper ends of the guide members 58 and 59. The side plates 74b and 74c slidably oppose the outer sides of the guide members 58 and 59, respectively.

On a bracket 12e standing on the bottom surface 12b of the chassis 12, an eject switch (corresponding to an ejection detection member) 73 is provided at a vertical position opposite the eject button 22. When the eject button 22 is pressed, the eject switch 73 is turned ON so as to output an ejection signal.

Clamp mechanisms 76 and 77 holding the recording medium 36 or 46 from the right and left sides and a medium insertion detection switch 78 (an initial position detection part) are provided to the top plate 74a of the holder 56. Further, a guide rail 79 guiding insertion of an emergency tool is attached to the lower surface of the top plate 14a of the cover 14.

The second sliding member 75 attached to the inside of the first sliding member 74 includes a top plate 75a and side plates 75b and 75c. The top plate 75a comes into close contact with the lower surface of the top plate 74a. The side plates 75b and 75c extend downward inside the guide members 58 and 59, respectively. Guide parts 75d and 75e fitting into the guide grooves 42 or 52 of the recording medium 36 or 46 and contact parts (not graphically represented) coming into contact with the insertion-side end 36a or 46a of the recording medium 36 or 46 protrude from the inner walls of the side plates 75b and 75c.

Further, a guide wall 58a of the guide member 58 is inserted into the space formed between the side plates 74b and 75b and a guide wall 59a of the guide member 59 is inserted into the space formed between the side plates 74c and 75c so as to guide the sliding movements of the holder 56 in the A and B directions.

Next, a description is given of a configuration of the clamp mechanisms 76 and 77.

The clamp mechanisms 76 and 77 are configured to be caused by the insertion of the recording medium 36 or 46 into the holder 56 to hold the recording medium 36 or 46 by pressing both sides thereof. The clamp mechanism 76 includes a slide member (corresponding to an engagement member) 80 slidably attached to the top plate 74a and a torsion spring 82 biasing the slide member 80 outward (leftward). The clamp mechanism 77 includes a slide member (corresponding to an engagement member) 81 slidably attached to the top plate 74a and a torsion spring 83 biasing the slide member 81 outward (rightward).

FIGS. 7A through 7E are a front view, a top plan view, a rear view, a side view, and a bottom plan view, respectively, of the slide member 80 provided on the left side on the holder 56.

Referring to FIGS. 7A through 7E, the slide member 80 includes a sliding part 80a, extension parts 80b and 80c, and a spring holding part 80d. The sliding part 80a has an angular C-letter shape and slides relative to the top plate 74a. The extension parts 80b and 80c extend from both ends of the sliding part 80a in its sliding directions so as to be prevented from coming off the top plate 74a. The spring holding part 80d catches and holds an end of the torsion spring 82. A pair of guide pins 80e and 80f, a contact part 80g, an engagement part 80h, and a pressing part 80i protrude from the lower surface of the sliding part 80a. The contact part 80g comes into contact with the insertion-side end 36a or 46a of the recording medium 36 or 46. The engagement part 80h is formed in a trapezoidal shape in a middle position between the guide pins 80e and 80f. The pressing part 80i presses the medium insertion detection switch 78 on the side of the contact part 80g opposite to the side on which the contact part 80g comes into contact with the insertion-side end 36a or 46a.

The guide pins 80e and 80f fit with angled grooves 74e and 74f (indicated by a broken line in FIG. 4), respectively, formed on the top plate 74a. Accordingly, when the insertion-side end 36a or 46a of the recording medium 36 or 46 presses the contact part 80g in the insertion or A direction, the guide pins 80e and 80f move inward along the angled grooves 74e and 74f. As a result, the slide member 80 moves in a direction to approach the side of the recording medium 36 or 46, and the engagement part 80h engages the corresponding clamp recess 44 or 54.

Further, the slide member 80 moves in the insertion or A direction to clamp the recording medium 36 or 46 from its right and left sides, and the pressing part 80i comes into contact with the strip part of the medium insertion detection switch 78 to turn the medium insertion detection switch 78 ON.

The slide member 81 is formed to be the mirror image of the slide member 80 in shape. The only difference is that the pressing part 80i is not provided to the slide member 81. Accordingly, a description of the other common parts is omitted. The engagement part 80h of the slide member 80 and an engagement part 81h (FIG. 11, for instance) of the slide member 81 move to the inside of the guide walls 58a and 59a of the guide members 58 and 59 to fit into the clamp recesses 44 or 54. As a result, the slide members 80 and 81 are free of restriction on their movements in the insertion or A direction imposed by the guide walls 58a and 59a, thus being slidable in the insertion or A direction.

Accordingly, in the process of the recording medium 36 or 46 being inserted into the holder 56, the slide members 80 and 81 move in directions to approach each other while moving in the insertion direction, and have the engagement parts 80h and 81h engage the clamp recesses 44 or 54 of the recording medium 36 or 46 from its sides, thereby holding the recording medium 36 or 46 from its sides.

Next, a description is given of a configuration of the holder drive mechanism 60.

FIG. 8 is an enlarged plan view of part of the holder drive mechanism 60. FIG. 9 is a left side view of the holder drive mechanism 60.

Referring to FIGS. 8 and 9, the holder drive mechanism 60 includes a motor 86 provided on the left side in the rear part of the chassis 12 and a transmission mechanism 88 transmitting a rotational driving force from the motor 86 to the holder 56. The transmission mechanism 88 includes a worm 90 fitted to the rotary shaft of the motor 86, a worm wheel 91 engaging the worm 90, a speed reducing gear group 96 including a plurality of reduction gears 92 through 95, and a rack 100 engaged with a pinion 98 provided on the output side of the speed reducing gear group 96.

The rack 100 is fixed to the left side of the holder 56, and extends in the A and B directions. Therefore, when the rotational driving force of the motor 86 is transmitted to the pinion 98 through the transmission mechanism 88, the holder 56 moves in the A or B direction together with the rack 100.

The gear 95 engaging the pinion 98 is supported so as to be slidable in the axial directions of a shaft 102, and biased by a coil spring 104 coiled around the shaft 102 to the position of engagement with the pinion 98. The gear 95 biased by the coil spring 104 forms a disengagement mechanism. The gear 95 is movable to a disengagement position against the spring force of the coil spring 98, where the gear 95 disengages from the pinion 98 to switch the pinion 98 to a free state.

That is, even if the motor 86 fails with the recording medium 36 or 46 being loaded, the holder 56 can be moved in the ejection or B direction by sliding the gear 95 to the disengagement position.

Figure 10:
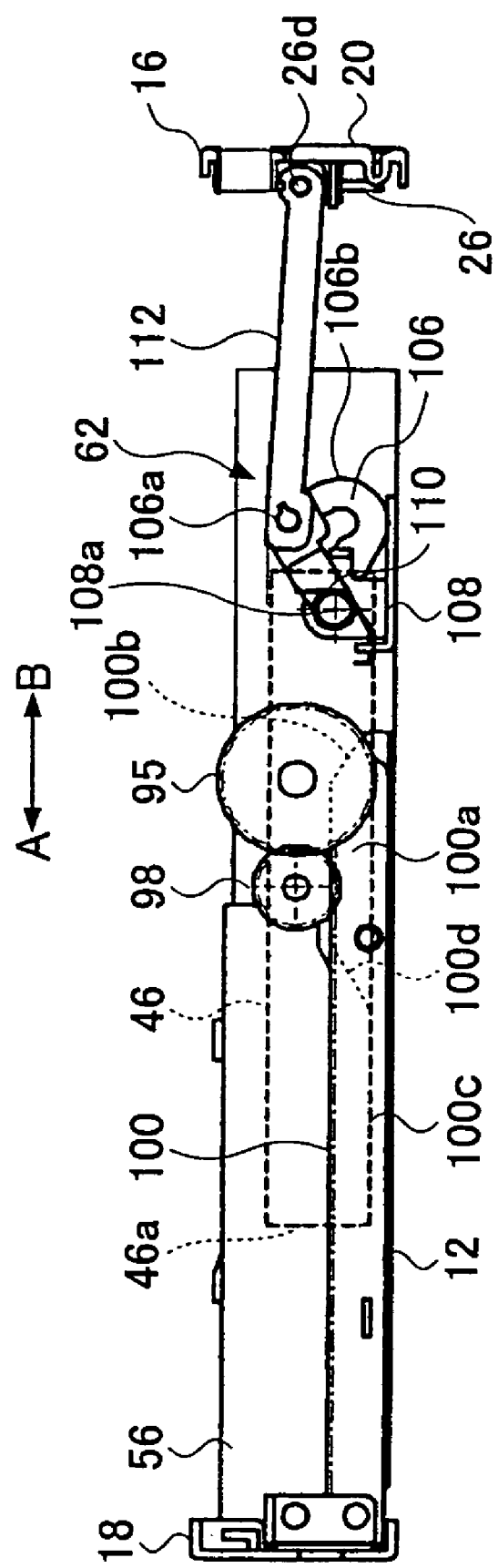
FIG. 10 is a side view of an opening and closing mechanism of the recording medium drive unit according to the embodiment of the present invention.

Next, a description is given of a configuration of the opening and closing mechanism 62 opening and closing the lid member 26. FIG. 10 is a side view of the opening and closing mechanism 62.

Referring to FIGS. 8 and 10, the opening and closing mechanism 62 includes a crank member 106, a bracket 108, a torsion spring 110, and an opening and closing arm 112. The crank member 106 is pressed by a slanted cam part 100b provided to an end of a vertical wall 100a integrated with the rack 100. The bracket 108 supports the crank member 106 so that the crank member 106 is rotatable. The torsion spring 110 is coiled around a shaft 108a of the bracket 108, and biases the crank member 106 clockwise. The opening and closing arm 112 is joined to an eccentric pin 106a of the crank member 106.

The crank member 106 is supported by the shaft 108a laterally penetrating the vertical wall of the bracket 108. The crank member 106 includes a cam part 106b that slides on the vertical wall 100 as the holder 56 moves as described below. A change in the sliding position of the cam part 106b causes the crank member 106 to rotate along a vertical plane. The opening and closing arm 112 joined to the eccentric pin 106a of the crank member 106, rocking along a vertical surface in accordance with the angle of rotation of the eccentric pin 106a as a connecting rod, moves in the A direction to open the lid member 26 or in the B direction to close the lid member 26.

An end of the opening and closing arm 112 is rotatably connected to a pin 26d protruding from the left side of the flap 26a of the lid member 26. The crank member 106 is provided in the path of movement of the vertical wall 100a, and includes the cam part 106b pressed by the vertical wall 100a. When the holder 56 is in a loading position (where an inserted recording medium is connected to the medium connector 64), the cam part 106b is separated from the slanted cam part 10b, and rotates clockwise to drive the lid member 26 to the closed position. Until the holder 56 is moved in the A direction by the holder drive mechanism 60 and reaches a position immediately before the loading position, the cam part 106b slides on the vertical wall 10a to drive the lid member 26 to the open position.

A recess 100c that is concave so as to rotate the cam part 106b clockwise when the holder 56 waits in an initial position where the recording medium 36 or 46 is inserted or ejected is provided to the vertical wall 100a. A slanted cam part 100d is formed to connect the vertical wall 100a and the recess 100c.

That is, the lid member 26 is driven in the opening or closing direction in the process of the cam part 106b sliding on the slanted cam parts 100b and 100d, and is held in the open position while the cam part 106b slides on the vertical wall 100a.

When the holder 56 waits in the initial position, the cam part 106b is inserted into the recess 100c and has rotated clockwise. When the recording medium 36 or 46 is inserted through the insertion opening 20, the lid member 26 rotates clockwise. This clockwise rotation is transmitted via the opening and closing arm 112 to the crank member 106, allowing the crank member 106 to rotate counterclockwise against the spring force of the torsion spring 104.

Accordingly, the lid member 26 is opened and closed by the opening and closing mechanism 62. The opening and closing mechanism 62 is configured to allow the lid member 26 to move in the opening direction from the closed position irrespective of the position of the holder 56.

Next, a description is given of the medium loading operation of the recording medium drive unit 10 having the above-described structure.

Figure 11:
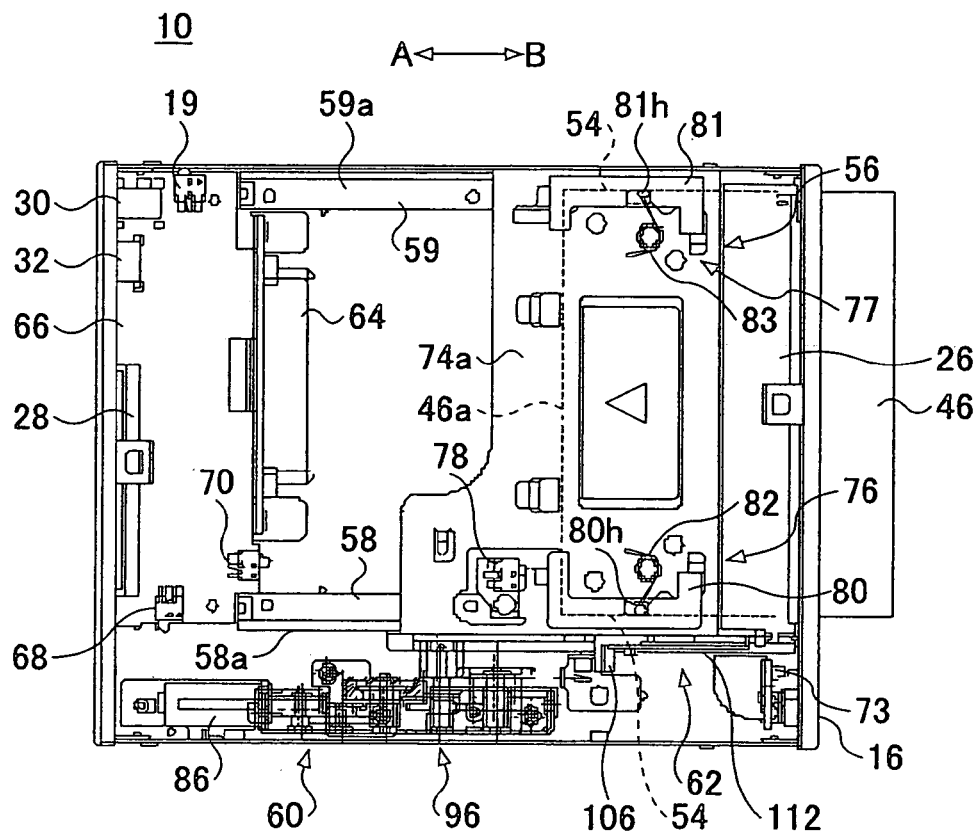
FIG. 11 is a plan view of the recording medium drive unit for illustrating a medium insertion operation according to the embodiment of the present invention.
Figure 12:
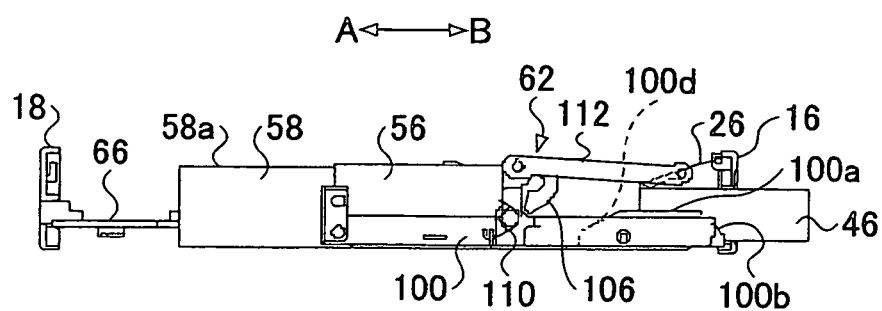
FIG. 12 is a side view of the recording medium drive unit for illustrating the medium insertion operation according to the embodiment of the present invention.

FIG. 11 is a plan view of the recording medium drive unit 10 for illustrating a medium insertion operation. FIG. 12 is a side view of the recording medium drive unit 10 for illustrating the medium insertion operation. For convenience of description, the cover 14 is removed in FIG. 11, and the chassis 12 and the cover 14 are removed in FIG. 12, respectively, from the recording medium drive unit 10.

Referring to FIGS. 11 and 12, when the smaller-size recording medium 46 is inserted into the insertion opening 20, the insertion-side end 46a of the recording medium 46 presses the lid member 26 in the opening direction, and enters inside the holder 56. The guide parts 75d and 75e protruding from the inner walls of the side plates 75b and 75c fit into the guide grooves 52 of the recording medium 46 so as to guide the insertion direction and the vertical position of the recording medium 46.

When the recording medium 46 is further inserted in the A direction inside the holder 56, the contact parts 80g and 81g of the slide members 80 and 81, respectively, provided to the top plate 74a of the holder 56 are pressed in the insertion or A direction. When the holder 56 is in the initial position, the slide members 80 and 81 are biased outward (in disengagement directions to disengage from the recording medium 46) by the torsion springs 82 and 83, respectively. Accordingly, the engagement parts 80h and 81h fit into cutouts 58b and 59b (FIGS. 16A and 16B) provided to the guide walls 58a and 59a of the guide members 58 and 59, respectively, so that the slide members 80 and 81 remain open in the leftward and rightward directions.

Figure 13B:
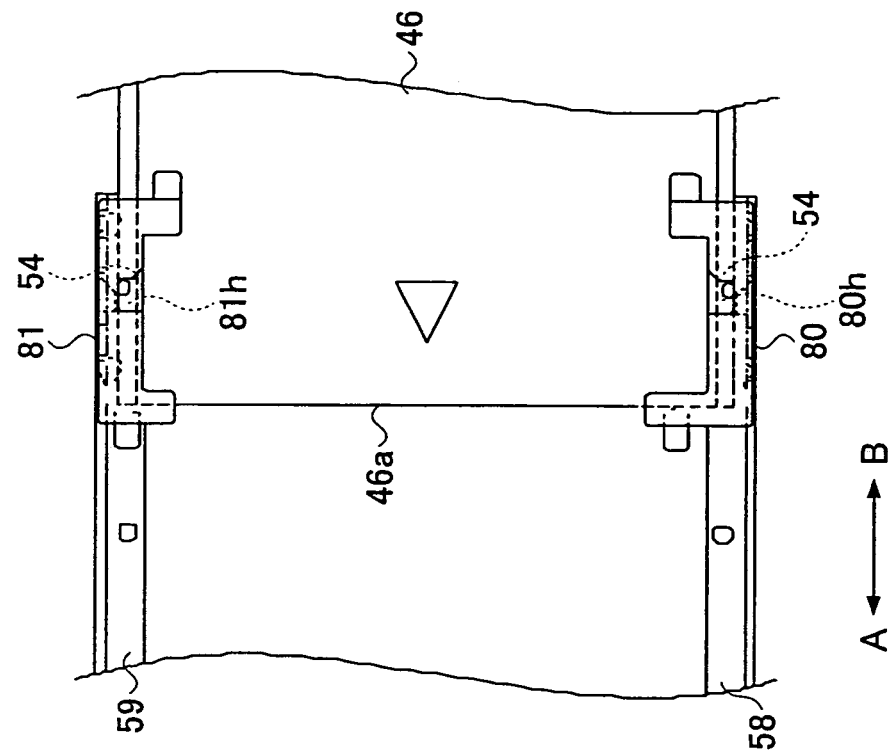
FIGS. 13A and 13B are plan views showing the state of the slide members before operation according to the embodiment of the present invention.
Figure 13A:
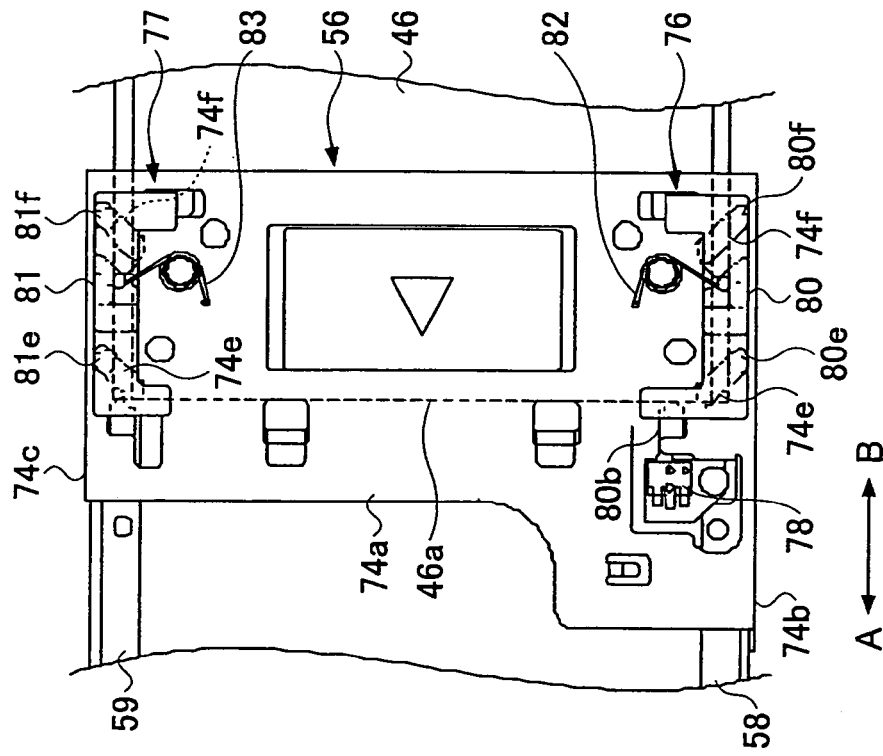
Figure 14B:
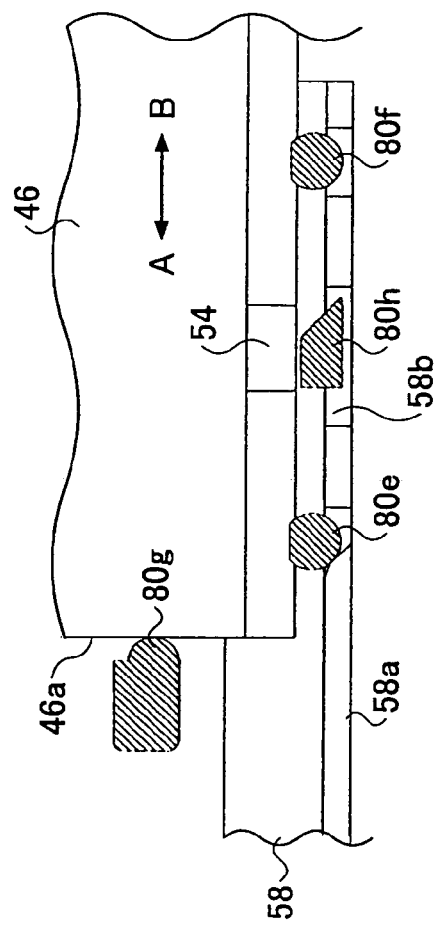
FIGS. 14A and 14B are plan views showing the engagement relationships of the projecting parts (indicated by hatching) of the slide members according to the embodiment of the present invention.
Figure 14A:
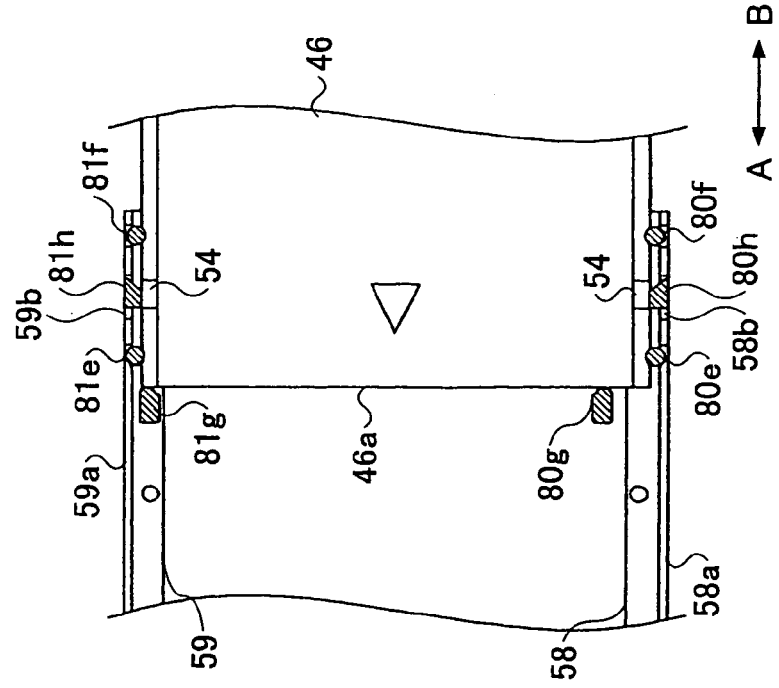

FIGS. 13A and 13B are plan views showing the state of the slide members 80 and 81 before operation. FIGS. 14A and 14B are plan views showing the engagement relationships of the projecting parts (indicated by hatching) of the slide members 80 and 81. FIG. 14A shows the state of the projecting parts of the slide members 80 and 81 before a clamping operation. FIG. 14B is an enlarged view of part of FIG. 14A. In FIG. 13B, the holder 56 and the torsion springs 82 and 83 are omitted for convenience of description.

Referring to FIGS. 13A and 13B, the slide member 80 has its guide pins 80e and 80f fitted into the corresponding angled grooves 74e and 74f (indicated by a broken line), respectively, formed in the top plate 74a. The slide member 81 has its guide pins 81e and 81f fitted into the corresponding angled grooves 74e and 74f (indicated by a broken line), respectively, formed in the top plate 74a. As a result, when the slide members 80 and 81 are pressed in the insertion or A direction, as the recording medium 46 is inserted in the same direction, the slide members 80 and 81 can move to the inside along the angled grooves 74e and 74f.

Referring to FIGS. 14A and 14B, the engagement parts 80h and 81h of the slide members 80 and 81 before the clamping operation do not fit into the clamp recesses 54, but engage the cutouts 58b and 59b formed in the guide walls 58a and 59a of the guide members 58 and 59. Since the slide members 80 and 81 are biased outward (in the disengagement directions) by the torsion springs 82 and 83, respectively, the engagement parts 80h and 81h are kept engaging the cutouts 58b and 59b.

Accordingly, the holder 56 is prevented from moving in the insertion direction by the guide walls 58a and 59a of the guide members 58 and 59 through the slide members 80 and 81. Therefore, the holder 56 is locked in the initial position by the slide members 80 and 81 until the recording medium 46 is inserted.

Figure 15B:
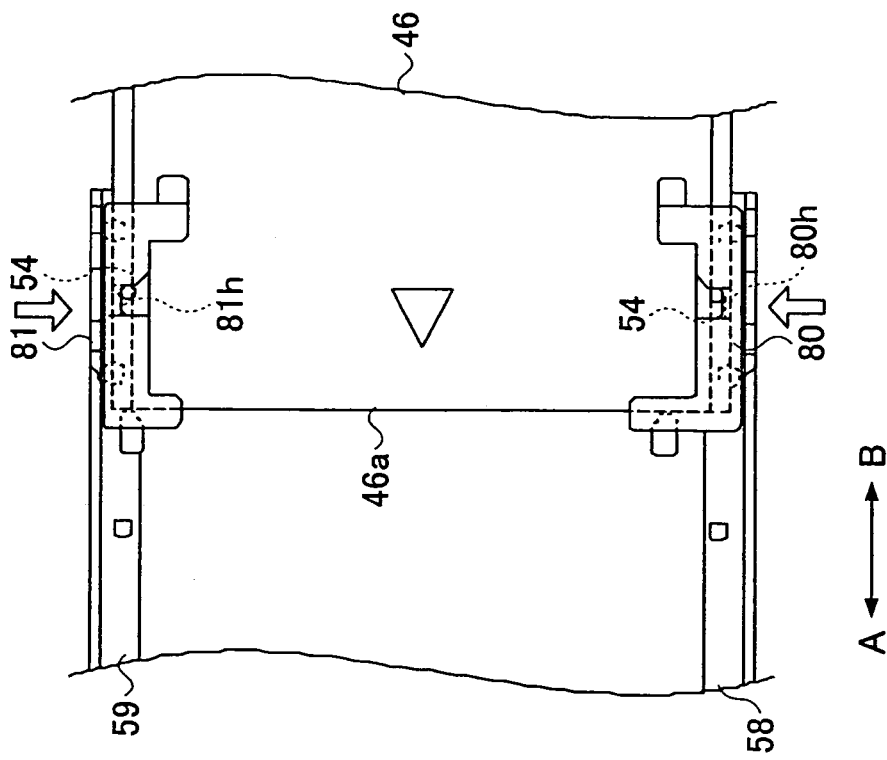
FIGS. 15A and 15B are plan views showing the state of the slide members after a clamping operation according to the embodiment of the present invention.
Figure 15A:
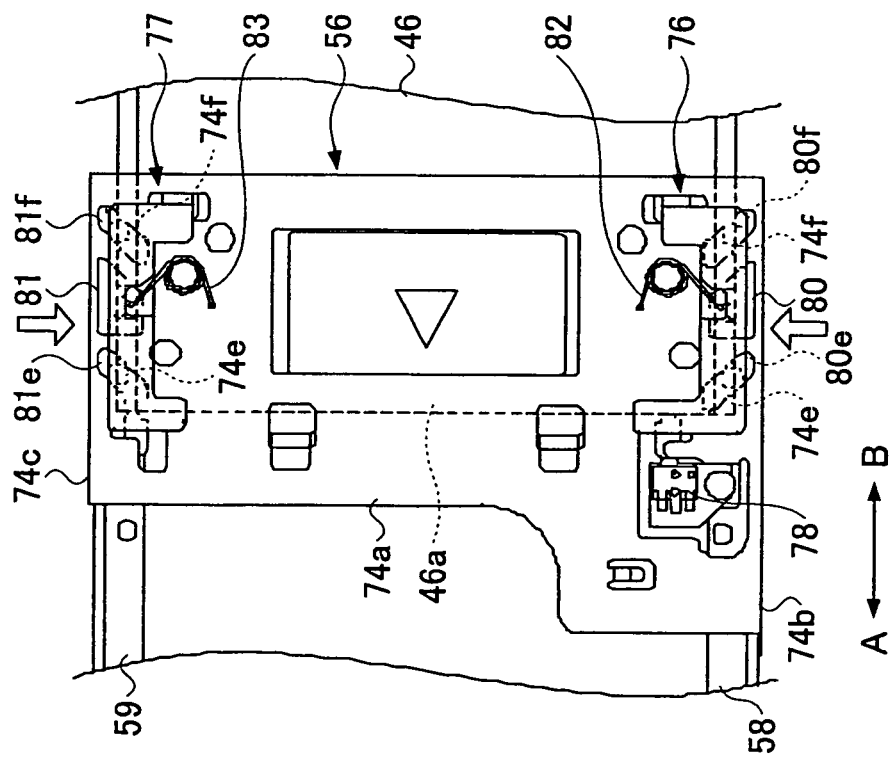
Figure 16B:
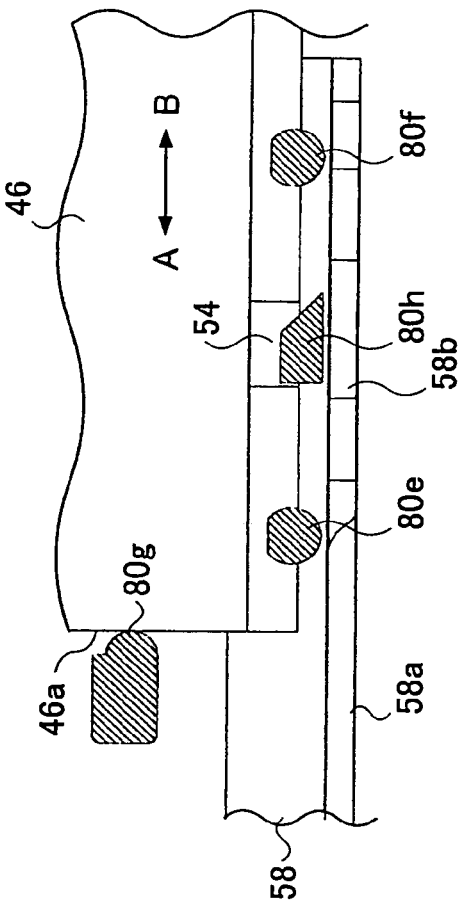
FIGS. 16A and 16B are plan views showing the engagement relationships of the projecting parts (indicated by hatching) of the slide members according to the embodiment of the present invention.
Figure 16A:
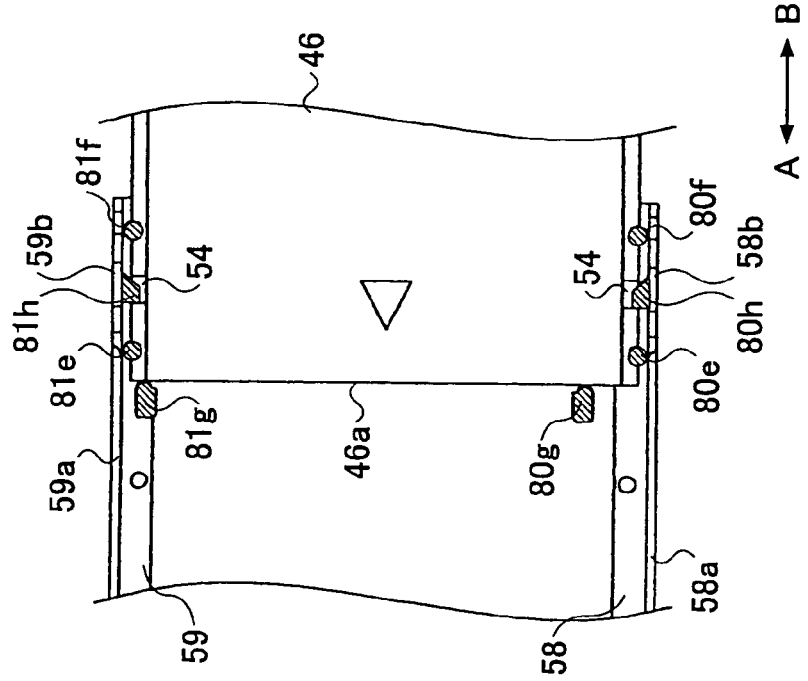

FIGS. 15A and 15B are plan views showing the state of the slide members 80 and 81 after the clamping operation. FIGS. 16A and 16B are plan views showing the engagement relationships of the projecting parts (indicated by hatching) of the slide members 80 and 81. FIG. 16A shows the state of the projecting parts of the slide members 80 and 81 after the clamping operation. FIG. 16B is an enlarged view of part of FIG. 16A. For convenience of description, the holder 56 and the torsion springs 82 and 83 are omitted in FIG. 15B.

Referring to FIGS. 15A and 15B, the slide members 80 and 81 slide at an angle (for instance, at an angle of 20°) to the insertion or A direction to move in a direction to approach the sides of the recording medium 46 from both its left and right sides, so that the engagement parts 80h and 81h engage the clamp recesses 54. As a result, the recording medium 46 is clamped from both sides by the slide members 80 and 81 so as to be held therebetween. Further, the clamp recesses 54 are engaged with and held by the engagement parts 80h and 81h. Accordingly, the recording medium 46 is held in the holder 56 by the clamping operation of the clamp mechanisms 76 and 77.

Referring to FIGS. 16A and 16B, the insertion of the recording medium 46 causes the contact parts 80g and 81g of the slide members 80 and 81 to be pressed in the insertion or A direction, and the guide pins 80e and 80f of the slide member 80 and the guide pins 81e and 81f of the slide member 81 to move along the angled grooves 74e and 74f formed in the top plate 74a. Thus, the slide members 80 and 81 move to the inside to hold the recording medium 46 by clamping from both sides.

At this point, the slide members 80 and 81 after the clamping operation have their respective engagement parts 80h and 81h disengaged from the cutouts 58b and 59b and fitted into the clamp recesses 54. As a result, the slide members 80 and 81 laterally clamp the sides of the recording medium 46 inserted into the holder 56.

Simultaneously, the engagement parts 80h and 81h engage the clamp recesses 54, disengaging from the cutouts 58b and 59b to release the lock on the holder 56 so that the holder 56 is slidable in the A direction along the guide walls 58a and 59a of the guide members 58 and 59. Therefore, while the holder 56 moves in the insertion direction from a clamp position where the recording medium 46 is clamped until reaching the loading position, the slide members 80 and 81 retain the holder 56 in an unlocked state where the lock on the holder 56 is released, and are prevented from moving outward (canceling clamping the recording medium 46), sliding on the guide walls 58a and 59a, respectively. Thus, the slide members 80 and 81 are kept in a clamping state where the slide members 80 and 81 are displaced inward.

Figure 17:
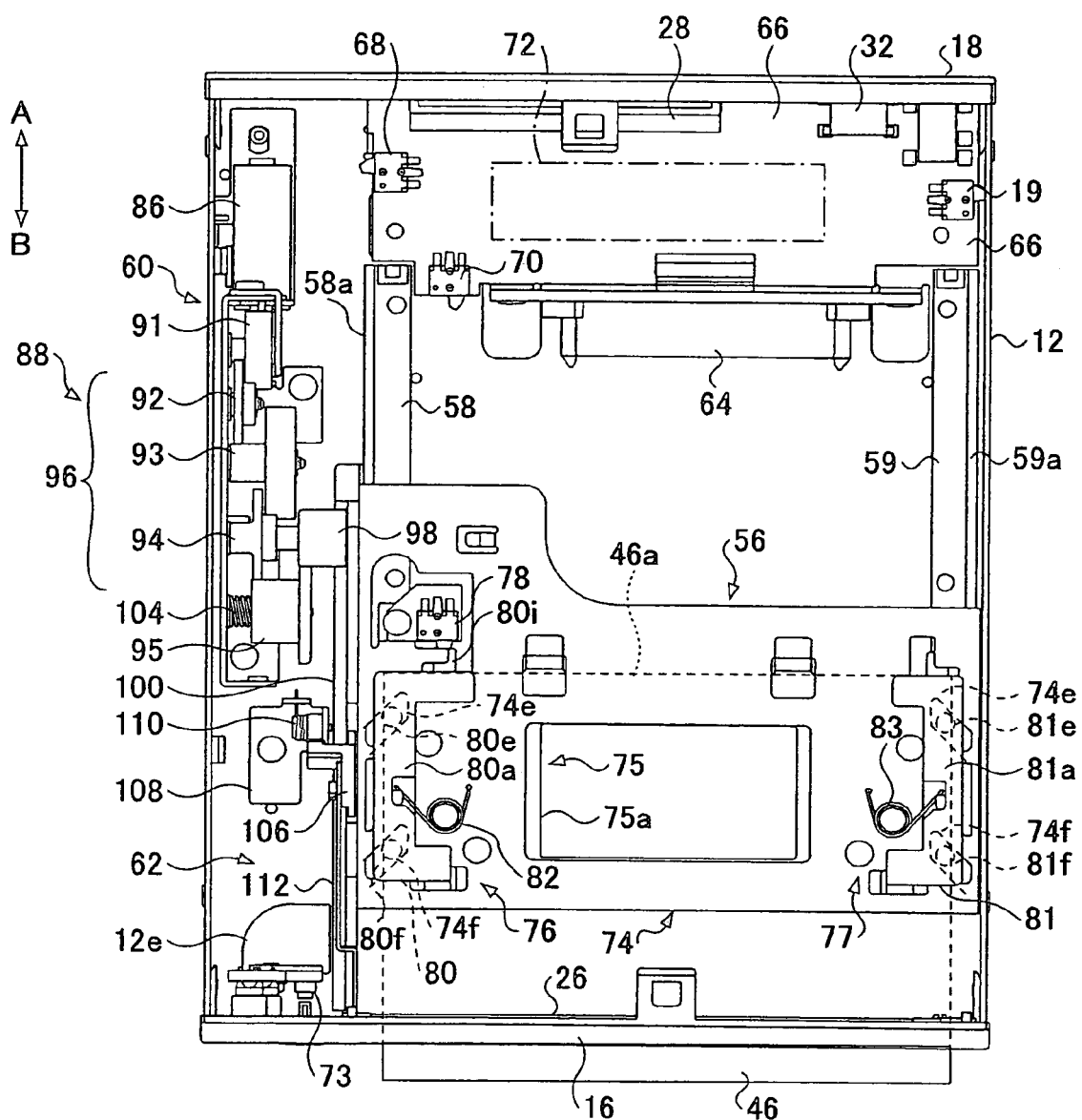
FIG. 17 is a plan view of the recording medium drive unit having the second recording medium inserted into the holder according to the embodiment of the present invention.

FIG. 17 is a plan view of the recording medium drive unit 10 having the recording medium 46 inserted into the holder 56.

Referring to FIG. 17, when the recording medium 46 is inserted into the holder 56 to be in the clamp position where the recording medium 46 is clamped from both sides by the slide members 80 and 81, the pressing part 80i comes into contact with the strip part of the medium insertion detection switch 78 to turn the medium insertion detection switch 78 ON.

As a result, as described below, the control circuit 72 starts the motor 86 of the holder drive mechanism 60 to move the holder 56 in the A direction. The rotational driving force of the motor 86 is transmitted to the rack 100 through the worm 90, the worm wheel 91, the reduction gears 92 through 95, and the pinion 98. The holder 56, integrated with the rack 100, transports the recording medium 46 as clamped in the A direction.

Figure 18:
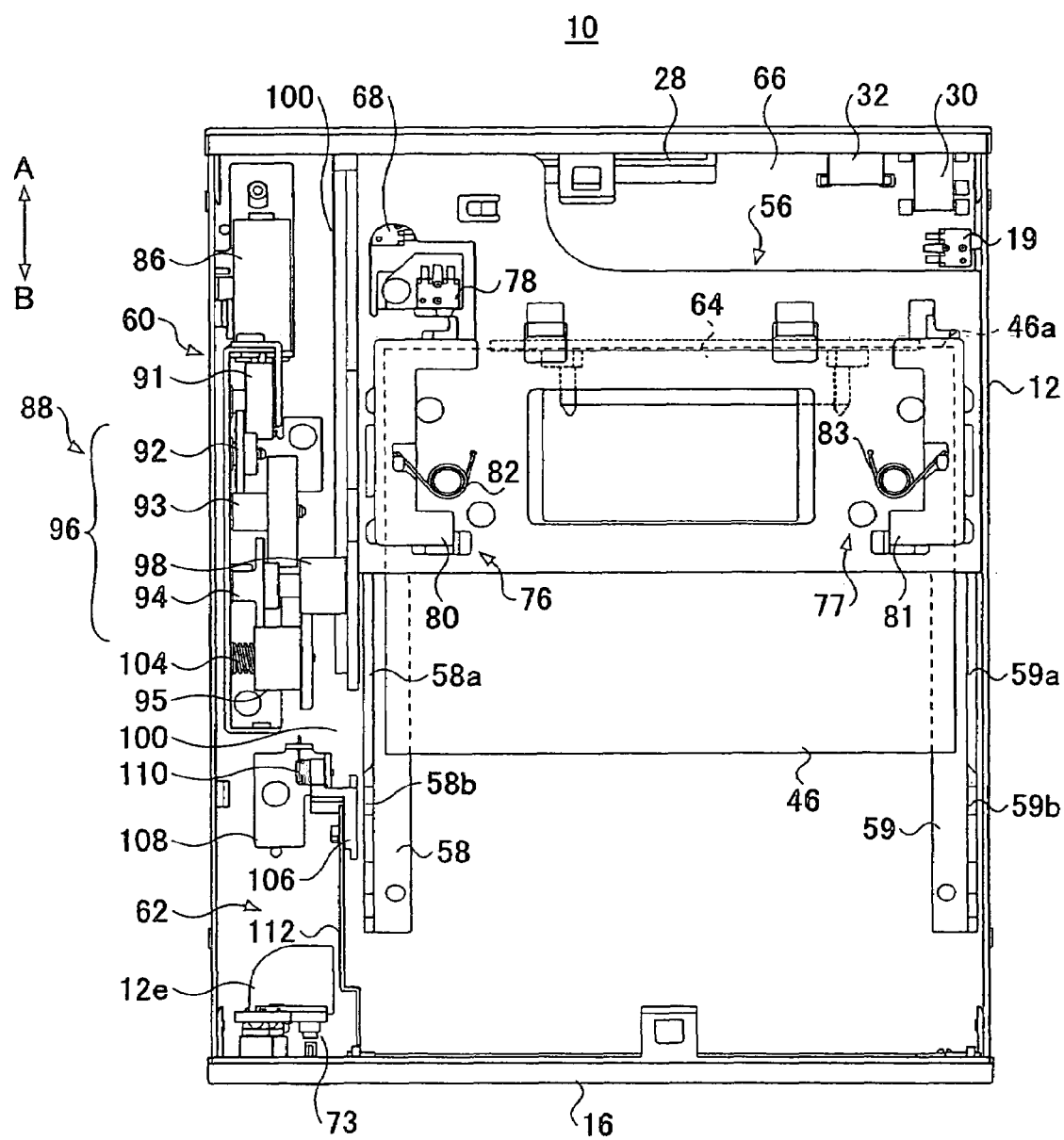
FIG. 18 is a plan view of the recording medium drive unit in the state where the holder and the second recording medium reach a loading position according to the embodiment of the present invention.
Figure 19:
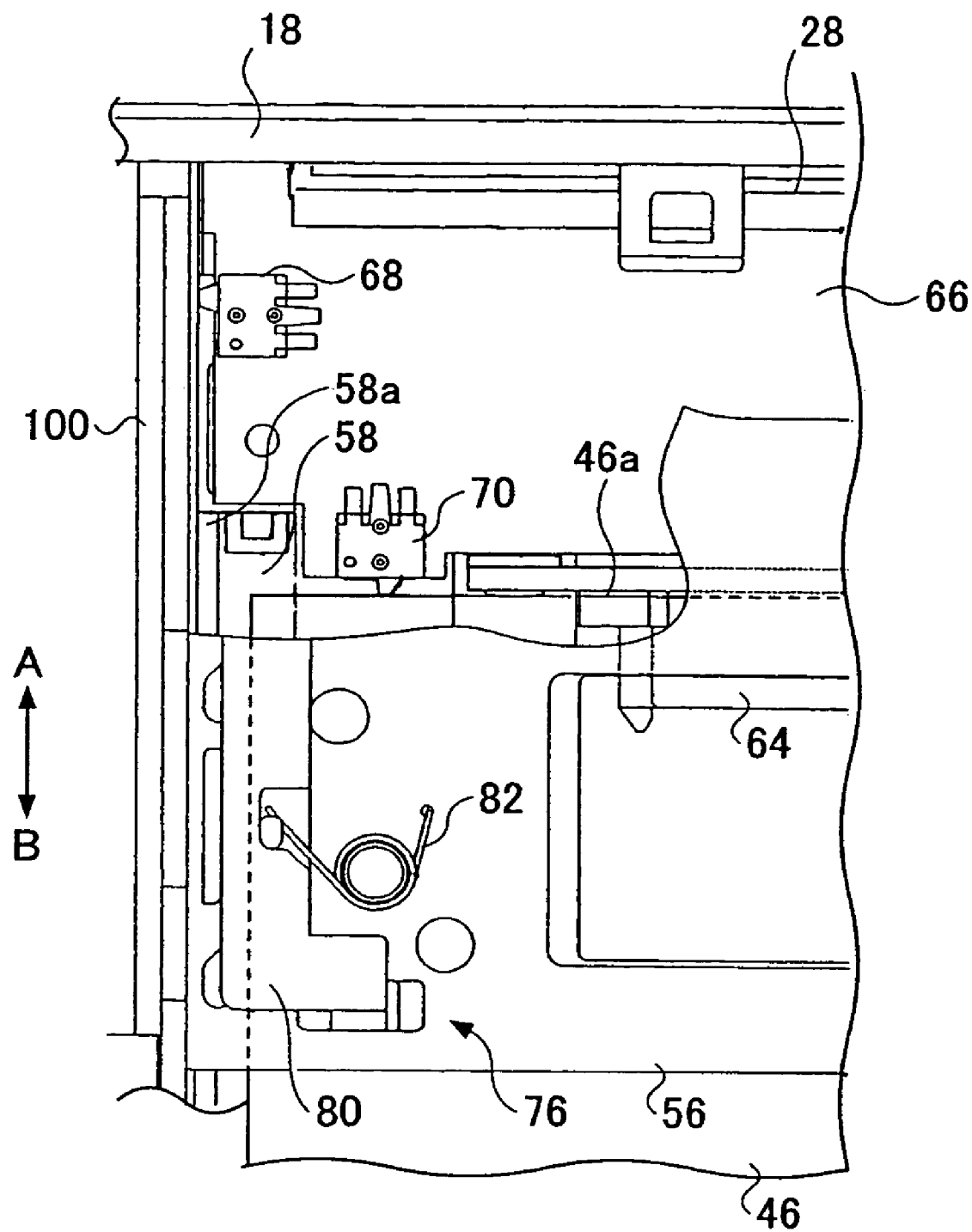
FIG. 19 is an enlarged plan view of part of the recording medium drive unit, showing the detection operations of a holder detection switch and a loading detection switch, according to the embodiment of the present invention.

FIG. 18 is a plan view of the recording medium drive unit 10 in the state where the holder 56 and the recording medium 46 reach the loading position. FIG. 19 is an enlarged plan view of part of the recording medium drive unit 10, showing the detection operations of the holder detection switch 68 and the loading detection switch 70.

Referring to FIGS. 19 and 20, when the holder 56 is driven by the holder drive mechanism 60 to reach the position immediately before the loading position, the rear end of the rack 100 presses the strip part of the holder detection switch 68 to turn the holder detection switch 68 ON. When the holder 56 moves further in the insertion direction to reach the loading position, the insertion-side end 46a of the recording medium 46 presses the strip part of the loading detection switch 70 to turn the loading detection switch 70 ON.

As a result, the control circuit 72 stops the rotation of the motor 86 of the holder drive mechanism 60. Thus, the holder 56 reaches the loading position so that the connector 50 provided to the insertion-side end 46a of the recording medium 46 is connected to the medium connector 64 provided to the base plate 66. As a result, data can be written to or read from the recording medium 46 through the medium connector 64.

Next, a description is given of the operation of ejecting the recording medium 46 thus loaded.

When the eject button 22 of the front panel 16 is pressed to turn the eject switch 73ON, the rotor (not graphically represented) of the motor 86 rotates in the direction reverse to the direction in which the rotor rotates at the time of loading the recording medium 46. As a result, the holder 56 moves in the ejection or B direction to eject the recording medium 46 to the insertion opening 20. The holder 56 returns to the initial position shown in FIG. 11, and the slide members 80 and 81 are moved by the spring forces of the torsion springs 82 and 83, respectively, to clamping canceling positions where the engagement parts 80h and 81h fit into the cutouts 58b and 59b (FIG. 18) of the guide members 58 and 59.

As a result, the recording medium 46 inserted into the holder 56 can be extracted in the ejection direction. Thus, when the holder 56 is driven to the initial position so that the recording medium 46 is ejected, the rear end of the recording medium 46 projects from the front side of the insertion opening 20. The rear end of the recording medium 46 is set to project sufficiently so that an operator extracts the recording medium with fingers, taking into consideration operability at the time of holding the recording medium.

Figure 20A:
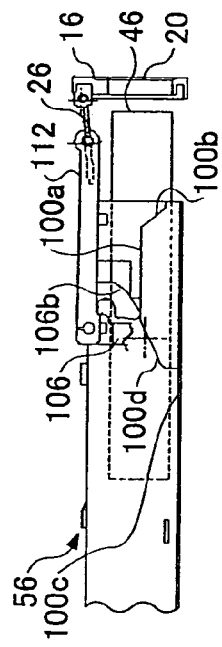
FIGS. 20A through 20F are side views of the opening and closing mechanism, showing its opening and closing operation, according to the embodiment of the present invention.
Figure 20B:
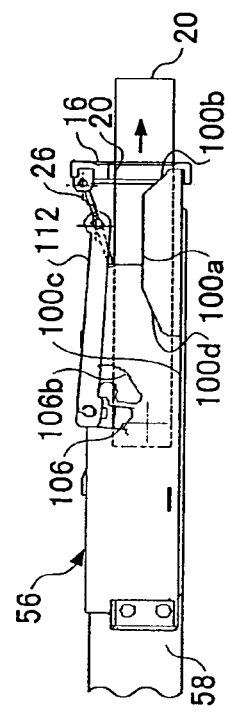
Figure 20C:
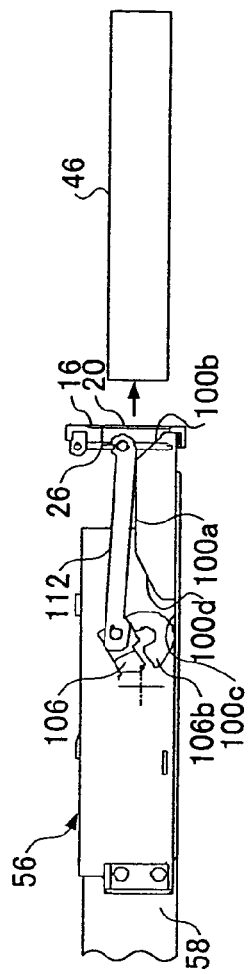
Figure 20D:
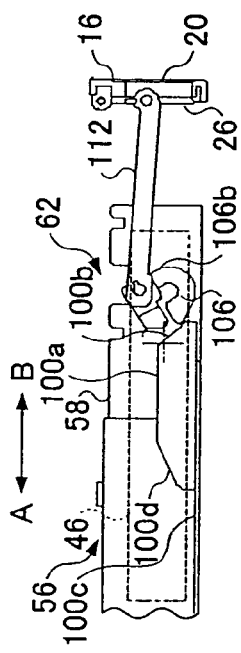
Figure 20E:
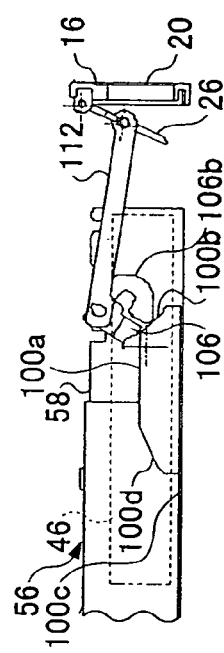
Figure 20F:
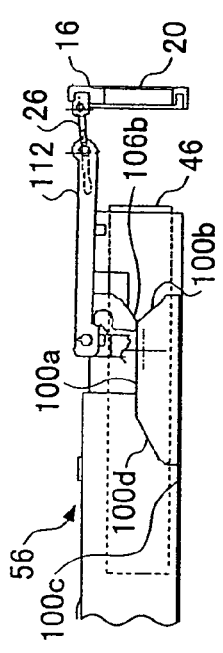

FIGS. 20A through 20F are side views of the opening and closing mechanism 62, showing its opening and closing operation. FIG. 20A shows the state where the recording medium 46 is loaded with the lid member 26 being closed. FIG. 20B shows the process of the opening operation accompanying the start of ejection. FIG. 20C shows the state where the lid member 26 is open. FIG. 20D shows the state where the holder 56 has returned to the initial position. FIG. 20E shows the state where the recording medium 46 is being extracted from the insertion opening 20. FIG. 20F shows the state where the recording medium 46 has been extracted from the insertion opening 20.

Referring to FIG. 20A, when the holder 56 is in the loading position, the lid member 26 closes the insertion opening 20, thus preventing ambient dust from entering inside. As described above, when the eject switch 73 is turned ON so that the motor 86 rotates in the direction reverse to that at the time of loading the recording medium 46, the holder 56 moves in the ejection or B direction.

Referring to FIG. 20B, the holder 56 moves in the ejection or B direction from the loading position (FIG. 18) so that the slanted cam part 100b of the vertical wall 100a integrated with the holder 56 to slide on the cam part 106b of the crank member 106, thus rotating the crank member 106 rotates counterclockwise. As a result, the opening and closing arm 112 joined to the crank member 106 moves in the A direction to rotate the lid member 26 in the opening direction.

Referring to FIG. 20C, when the holder 56 moves to the initial position (FIG. 17), the upper end of the vertical wall 100a slides on the cam part 106b of the crank member 106 so as to rotate the crank member 106 further counterclockwise. As a result, the opening and closing arm 112 joined to the crank member 106 moves further in the A direction to rotate the lid member fully to the open position. At this point, the lid member 26 is held in the open position displaced upward from the path through which the recording medium 46 passes.

Referring to FIG. 20D, immediately before the holder 56 reaches the initial position, like in the case of FIG. 20C, the cam part 106b of the crank member 106 slides on the upper end of the vertical wall 100a, so that the opening and closing arm 112 keeps the lid member 26 fully open. Then, the rear end of the recording medium 46 contained in the holder 56 passes below the fully open lid member 26 to approach and oppose the insertion opening 20.

Further, immediately before the holder 56 reaches the initial position, the slide members 80 and 81 are moved by the spring forces of the torsion springs 82 and 83, respectively, to the clamping canceling positions where the engagement parts 80h and 81h fit into the cutouts 58a and 59a (FIG. 18) of the guide members 58 and 59. As a result, the engagement parts 80h and 81h of the slide members 80 and 81 move leftward and rightward, respectively, so as to disengage from the clamp recesses 54, thereby canceling the clamping (engaging) of the recording medium 46.

Referring to FIG. 20E, the recording medium 46, transported in the ejection direction by the holder 56, is pushed in the ejection or B direction by the clamping canceling operation by the slide members 80 and 81, and moves to a position projecting from the insertion opening 20.

At this point, the lid member 26 is held in the open position, sliding on the upper surface of the recording medium 46. The opening and closing arm 112 is held in the open position by the lid member 26. The cam part 106b of the crank member 106, having passed the vertical wall 100a and the slanted cam part 100d, is held in a position separated above from the recess 100c.

Referring to FIG. 20F, when the recording medium 46 is extracted from the insertion opening 20, the crank member 106 is rotated clockwise by the spring force of the torsion spring 110 to move the opening and closing arm 112 in the B direction. As a result, the lid member 26 rotates counterclockwise in the closing direction to close the insertion opening 20.

Thus, by rotating the lid member 26 in the opening or closing direction in conjunction with the movement of the holder 56, the opening and closing mechanism 62 drives the lid member 26 so as not to prevent insertion or extraction of the recording medium 46.

Next, a description is given of the operation of loading the recording medium 36 having a greater depth than the recording medium 46.

Figure 21:
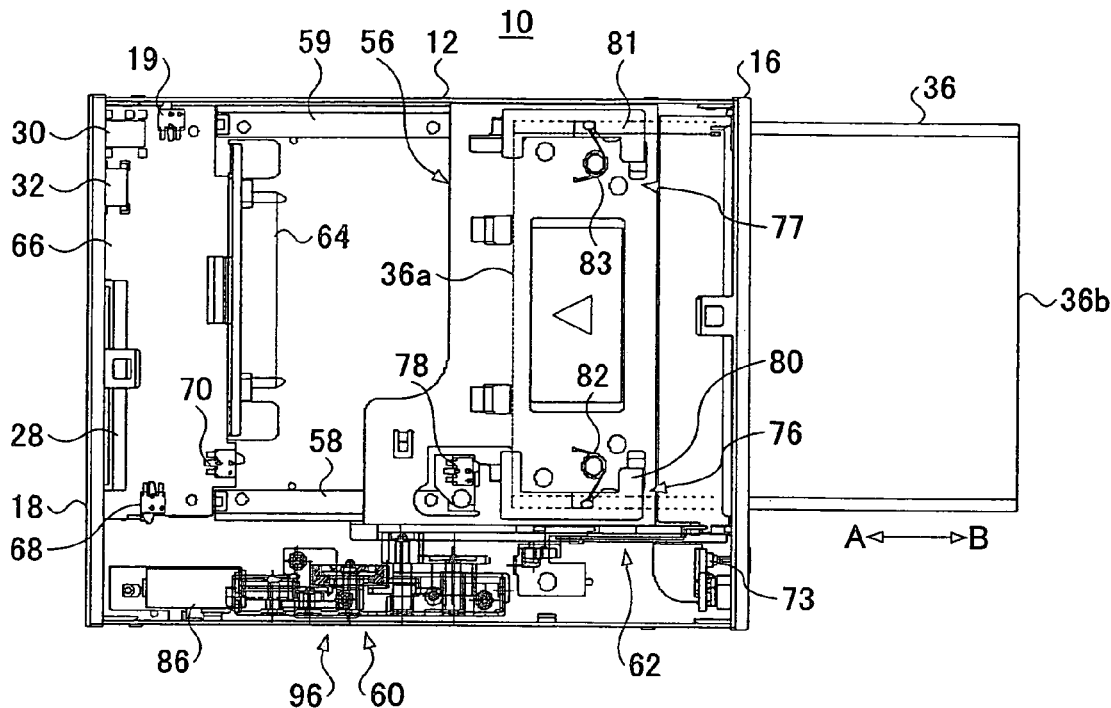
FIG. 21 is a plan view of the recording medium drive unit in the state where the first recording medium is inserted into the holder according to the embodiment of the present invention.
Figure 22:
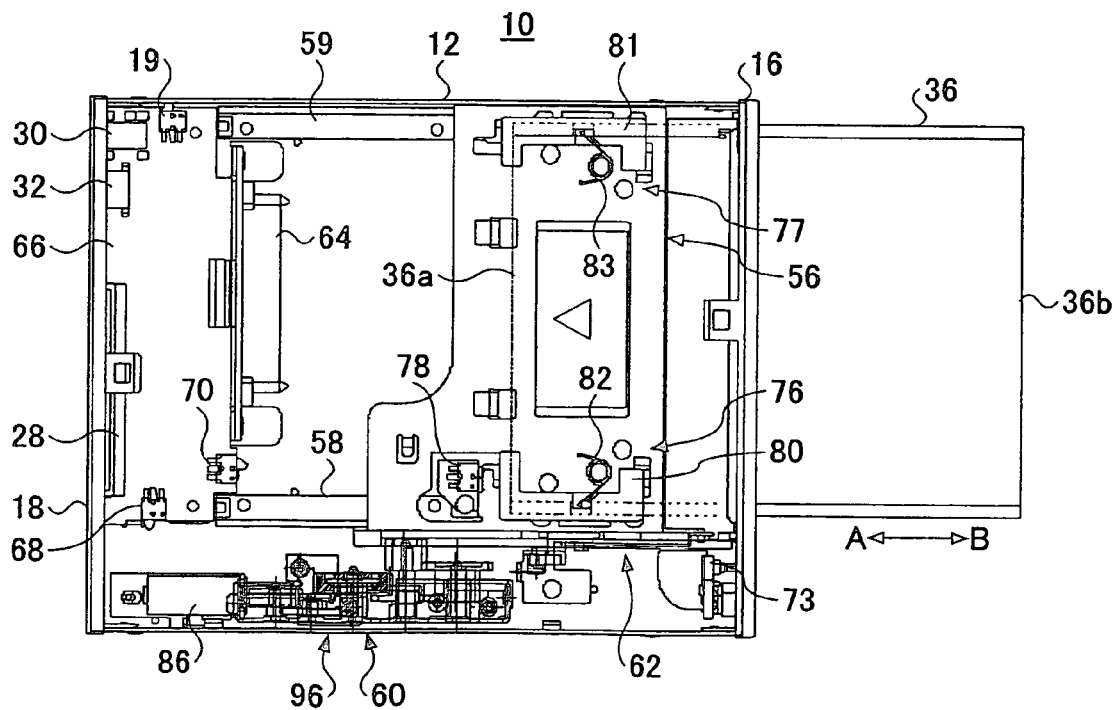
FIG. 22 is a plan view of the recording medium drive unit in the state where the first recording medium is clamped inside the holder according to the embodiment of the present invention.
Figure 23:
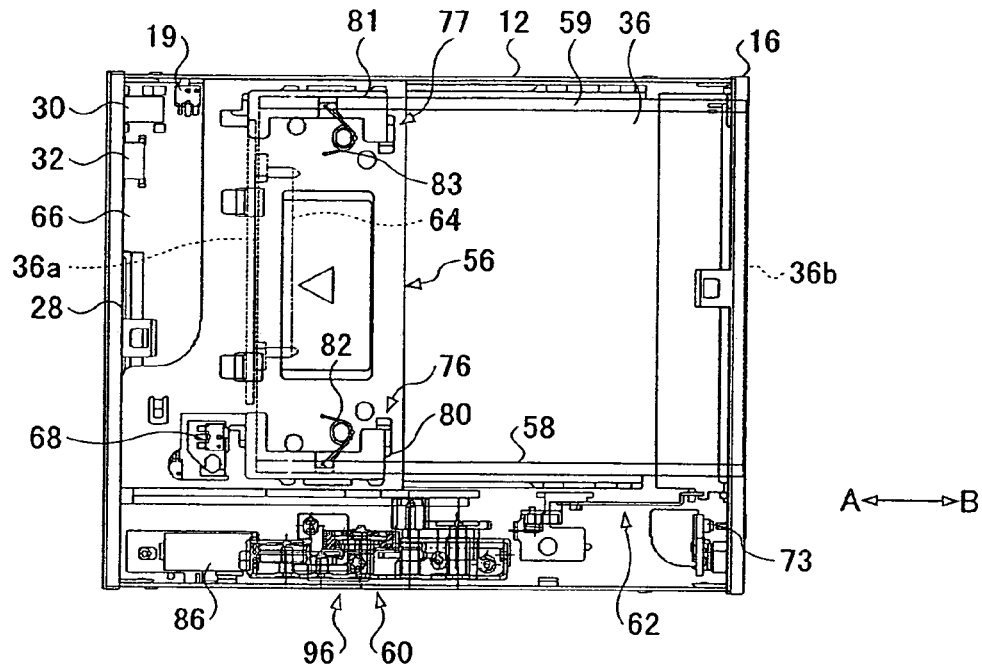
FIG. 23 is a plan view of the recording medium drive unit in the state where the first recording medium is loaded together with the holder according to the embodiment of the present invention.

FIG. 21 is a plan view of the recording medium drive unit 10 in the state where the recording medium 36 is inserted into the holder 56. FIG. 22 is a plan view of the recording medium drive unit 10 in the state where the recording medium 36 is clamped inside the holder 56. FIG. 23 is a plan view of the recording medium drive unit 10 in the state where the recording medium 36 is loaded together with the holder 56.

Referring to FIG. 21, when the recording medium 36 is inserted into the holder 56, the insertion-side end 36a of the recording medium 36 presses the lid member 26 in the opening direction, and enters inside the holder 56. As in the above-described case of the smaller-size recording medium 46, the guide parts 75d and 75e protruding from the inner walls of the side plates 75b and 75c fit into the guide grooves 42 of the recording medium 36 so as to guide the insertion direction and the vertical position of the recording medium 36.

When the recording medium 36 is further inserted in the A direction inside the holder 56, the contact parts 80g and 81g of the slide members 80 and 81, respectively, provided to the top plate 74a of the holder 56 are pressed in the insertion or A direction.

Referring to FIG. 22, when the recording medium 36 is inserted into the holder 56 to be in a clamp position, the recording medium 36 is clamped from both sides by the slide members 80 and 81. Then, the pressing part 80i comes into contact with the strip part of the medium insertion detection switch 78 to turn the medium insertion detection switch 78 ON.

As a result, the control circuit 72 starts the motor 86 of the holder drive mechanism 60 to move the holder 56 in the A direction. Thus, the holder 56 transports the recording medium 36 as clamped in the A direction.

Referring to FIG. 23, when the holder 56 is driven by the holder drive mechanism 60 to reach the position immediately before the loading position, the rear end of the rack 100 presses the strip part of the holder detection switch 68 to turn the holder detection switch 68 ON. When the holder 56 moves further in the insertion direction to reach the loading position, the insertion-side end 36a of the recording medium 36 presses the strip part of the loading detection switch 70 to turn the loading detection switch 70 ON.

As a result, the control circuit 72 stops the rotation of the motor 86 of the holder drive mechanism 60. Thus, the holder 56 reaches the loading position so that the connector 40 provided to the insertion-side end 36a of the recording medium 36 is connected to the medium connector 64 provided to the base plate 66.

The thus loaded recording medium 36 stops at a position to close the insertion opening 20 with the ejection-side end 36b fitting thereinto. Accordingly, when the recording medium 36 having a greater depth is loaded, the lid member 26 is held in the opening position remaining in contact with the upper surface of the recording medium 36 (FIG. 20E).

In the case of ejecting the recording medium 36, as in the above-described case of the recording medium 46, the motor 86 is rotated in the reverse direction to move the holder 56 in the ejection direction so that the recording medium 36 is ejected from the insertion opening 20. When the holder 56 has reached the initial position, and the recording medium 36 of a greater depth is thus ejected, the rear end of the recording medium 36 projects from the front side of the insertion opening 20 by approximately half the overall length of the recording medium 36. At this point, the amount of projection is set so that the position of the center of gravity of the recording medium 36 and friction with the holder 56 prevent the recording medium 36 from falling from the insertion opening 20.

Next, a description is given of a method of controlling the transportation speed of the holder drive mechanism 60 driving the holder 56.

Figure 24:
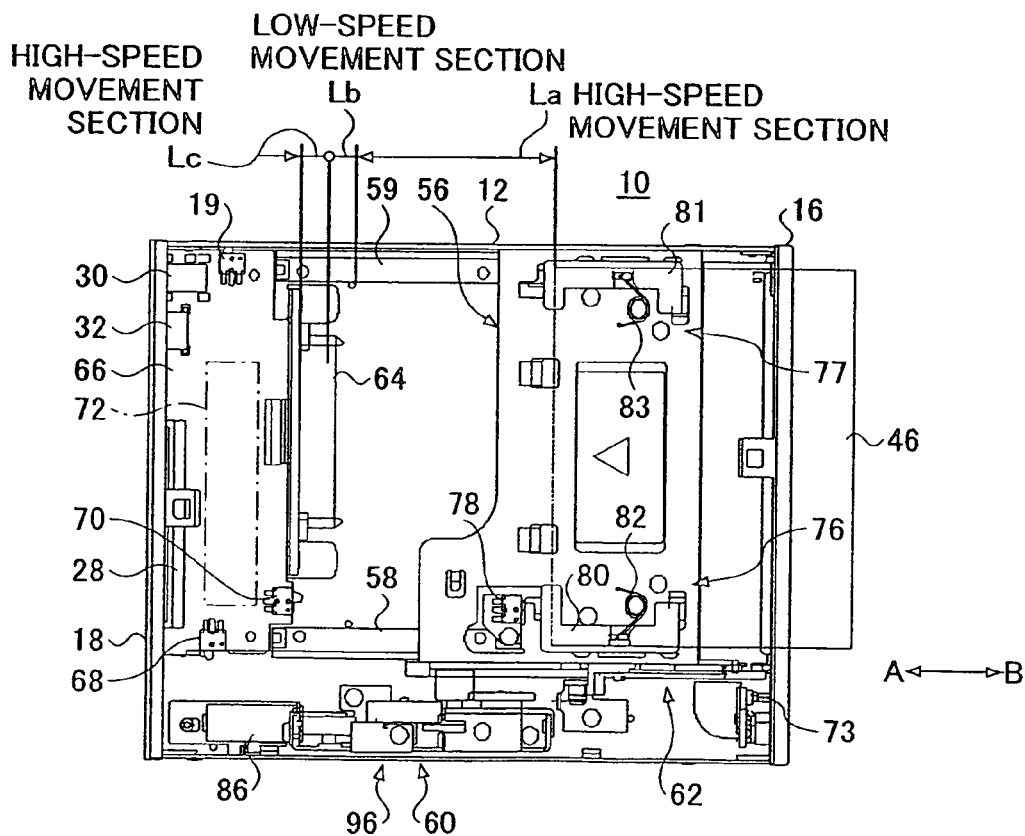
FIG. 24 is a plan view of the recording medium drive unit, showing the case of changing speed for moving the holder in three steps, according to the embodiment of the present invention.

FIG. 24 is a plan view of the recording medium drive unit 10, showing the case of changing speed for moving the holder 56 in three steps.

Referring to FIG. 24, when the holder 56 is moved in the insertion or A direction by the holder drive mechanism 60, the medium inserting operation may be performed with the transportation speed being controlled based on three sections; high-speed movement sections La and Lc and a low-speed movement section Lb.

The voltage applied to the motor 86 of the holder drive mechanism 60 is controlled step by step by the control circuit 72. The number of revolutions per minute (RPM) (driving torque) is switched based on the value of the applied voltage. That is, in the high-speed movement section La, when the recording medium 36 or 46 is inserted into the holder 56 to be clamped by the clamp mechanisms 76 and 77, the holder 56 is moved at high speed to transport the recording medium 36 or 46 smoothly and reduce time required for inserting the recording medium 36 or 46.

In the low-speed movement section Lb, the holder 56 is moved at low speed so as to ensure that the connector 40 or 50 of the recording medium 36 or 46 is connected to the medium connector 64. After counting a predetermined period of time in the control circuit 72, in the high-speed movement section Lc, the holder 56 is again moved at high speed so that the recording medium 36 or 46 is connected to the medium connector 64.

Figure 25:
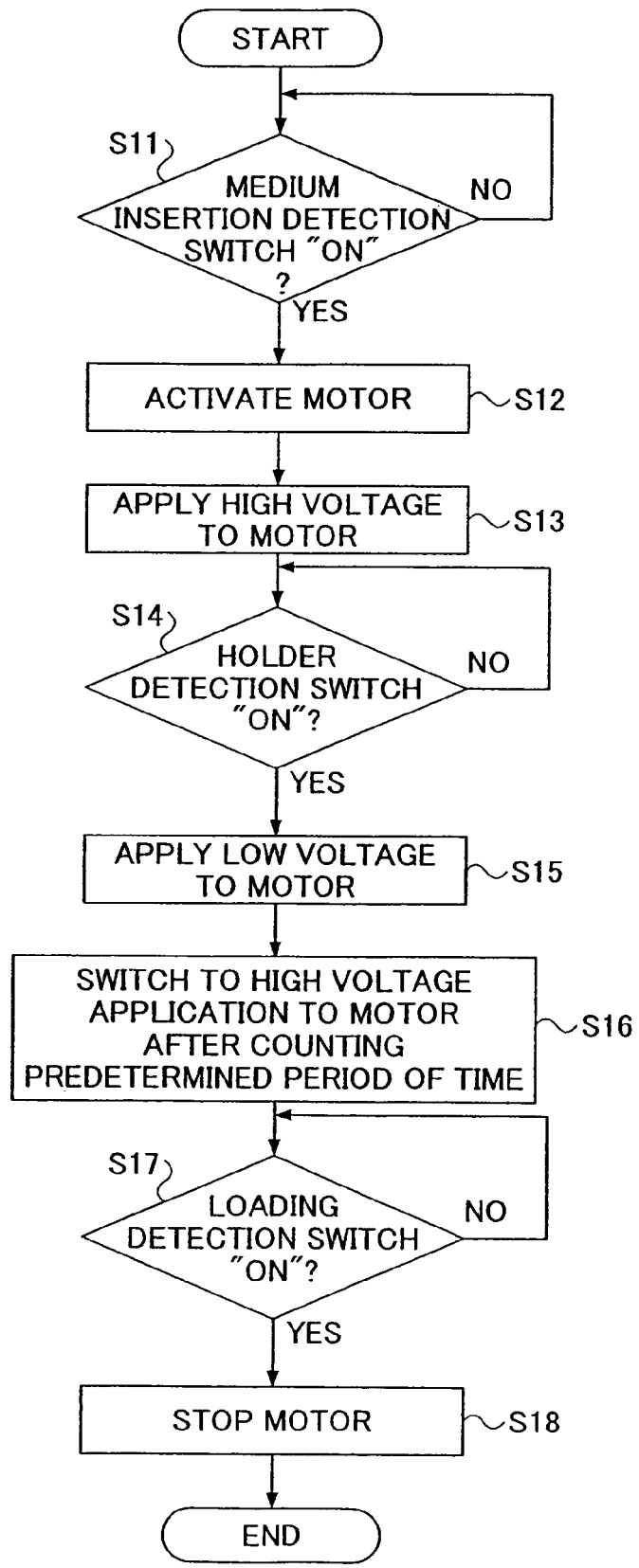
FIG. 25 is a flowchart of the operation performed by a control circuit of the recording medium drive unit at the time of medium insertion according to the embodiment of the present invention.
Figure 26:
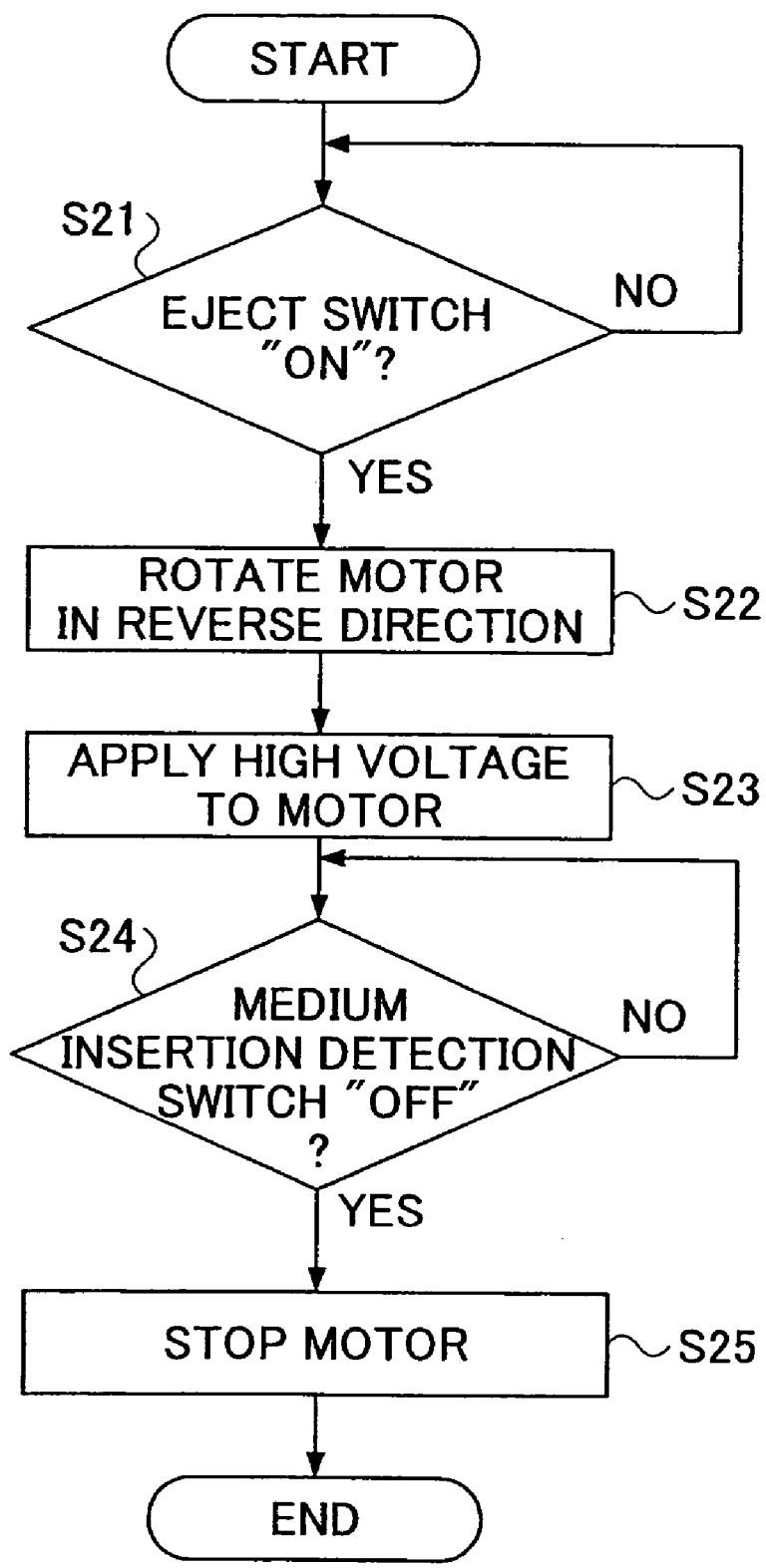
FIG. 26 is a flowchart of the operation performed by the control circuit at the time of medium ejection according to the embodiment of the present invention.

Next, a description is given, with reference to FIGS. 25 and 26, of the operation procedure of the control circuit 72.

FIG. 25 is a flowchart of the operation performed by the control circuit 72 at the time of medium insertion.

Referring to FIG. 25, in step S11, the control circuit 72 determines whether the medium insertion detection switch 78 is turned ON.

When the recording medium 36 or 46 is inserted into the holder 56 to reach the clamp position, the slide members 80 and 81 hold the recording medium 36 or 46 by clamping from both sides, and the pressing part 80i of the slide member 80 comes into contact with the strip part of the medium insertion detection switch 78 to turn the medium insertion detection switch 78 ON. Accordingly, if the medium insertion detection switch 78 is turned ON in step S11, the control circuit 72 determines that the insertion and the clamping of the recording medium 36 or 46 are completed, and proceeds to step S12, where the control circuit 72 starts energizing the motor 86 so that the motor 86 is activated. Next, in step S13, the control circuit 72 applies high voltage to the motor 86 so as to set the number of RPM of the motor 86 to high-speed rotation (high torque).

The rotational driving force of the motor 86 is transmitted to the rack 100 through the worm 90, the worm wheel 91, the reduction gears 92 through 95, and the pinion 98. Then, the holder 56 having the rack 100 moves in the high-speed movement section La at high speed while clamping the recording medium 36 or 46.

Next, in step S14, the control circuit 72 determines whether the holder detection switch 68 is turned ON. When the holder 56, driven by the holder drive mechanism 60 in the insertion direction, reaches the position immediately before the loading position, the rear end of the rack 100 presses the strip part of the holder detection switch 68 to turn the holder detection switch 68 ON. Accordingly, if the holder detection switch 68 is turned ON in step S14, the control circuit 72 determines that the holder 56 has reached the position immediately before the loading position, and proceeds to step S15. In step S15, the control circuit 72 applies low voltage to the motor 86 to switch the number of RPM of the motor 86 to low-speed rotation (low torque), thereby reducing the movement speed of the holder 56.

After switching the number of RPM of the motor 86 to low-speed rotation, in step S16, the control circuit 72 counts a predetermined period of time and causes the holder 56 to move the distance of the low-speed movement section Lb. Thereafter, the control circuit 72 again applies high voltage to the motor 86 to switch the number of RPM of the motor 86 to high-speed rotation (high torque). As a result, the movement speed of the holder 56 is switched from low speed (low torque) to high speed (high torque), so that the connector 40 or 50 of the recording medium 36 or 46 is smoothly connected to the medium connector 64 while the holder 56 moves in the high-speed movement section Lc.

Next, in step S17, the control circuit 72 determines whether the loading detection switch 70 is turned ON. The recording medium 36 or 46 transported by the holder 56 presses the loading detection switch 70 so that the loading detection switch 70 is turned ON. As a result, the arrival of the recording medium 36 or 46 at the loading position and the connection of the connector 40 or 50 with the medium connector 64 are detected.

If the loading detection switch 70 is turned ON, in step S18, the control circuit 72 terminates the energizing of the motor 86, and stops rotating the motor 86.

By thus changing the number of RPM of the motor 86 in three steps, the holder 56 can be transported efficiently so as to ensure smooth loading of the recording medium 36 or 46.

FIG. 26 is a flowchart of the operation performed by the control circuit 72 at the time of medium extraction.

Referring to FIG. 26, in step S21, the control circuit 72 determines whether the eject switch 73 is turned ON. The eject switch 73 is turned ON when the eject button 22 of the front panel 16 is pressed. Accordingly, if the eject switch 73 is turned ON in step S21, the control circuit 72 (, receiving a signal from the eject switch 73,) proceeds to step S22, where the control circuit 72 starts energizing the motor 86 with the opposite polarity, and rotates the motor 86 in the direction reverse to the direction in which the motor 86 is rotated at the time of loading the recording medium 36 or 46. Next, in step S23, the control circuit 72 applies high voltage to the motor 86 to set the number of RPM of the motor 86 to high-speed rotation (high torque). Then, the control circuit 72 moves the holder 56 in the ejection direction with high-speed rotation (high torque) without switching the voltage applied to the motor 86.

The reverse rotational driving force of the motor 86 is transmitted to the rack 100 through the worm 90, the worm wheel 91, the reduction gears 92 through 95, and the pinion 98. Then, the holder 56 having the rack 100 moves at high speed in the ejection direction while clamping the recording medium 36 or 46.

Next, in step S24, the control circuit 72 determines whether the medium insertion detection switch 78 is turned OFF. If the recording medium 36 or 46 inside the holder 56 is pushed in the ejection direction to turn the medium detection switch 78 OFF in step S24, in step S25, the control circuit 72 terminates the energizing of the motor 86, and stops rotating the motor 86.

Thus, at the time of ejecting the recording medium 36 or 46, high voltage is constantly applied to the motor 86 to set its number of RPM to high-speed rotation. As a result, the holder 56 is transported efficiently in the ejection direction so as to ensure smooth ejection of the recording medium 36 or 46. Further, time required for ejecting the recording medium 36 or 46 is reduced.

According to this embodiment, the number of RPM of the motor 86 is changed in three steps. Alternatively, it is also possible to perform switching control with four or more steps.

Further, according to this embodiment, the recording medium 36 or 46 is loaded. The present invention, however, is not limited to this embodiment, and is also applicable to apparatuses into which other types of recording media are loaded.

According to this embodiment, the clamp mechanisms 76 and 77 hold the recording medium 36 or 46 inside the holder 56 by both its right and left sides (side surfaces). Accordingly, it is ensured that the recording medium 36 or 46 inserted into the holder 56 is held by clamping from both sides. As a result, both of the recording media 36 and 46 can be loaded smoothly regardless of their difference in size (depth) and be connected to the medium connector 64 inside the drive unit 10 with reliability.

According to this embodiment, when the recording medium 46 is ejected, at least the rear end of the recording medium 46 projects from the insertion opening 20. On the other hand, when the recording medium 36 is ejected, the amount of projection of the recording medium 36 from the insertion opening 20 is set so as to prevent the recording medium 36 from falling off the holder 56. Accordingly, both of the recording media 36 and 46 can be ejected smoothly regardless of their difference in depth.

The present invention is not limited to the specifically disclosed embodiment, and variations and modifications may be made without departing from the scope of the present invention.

The present application is based on Japanese priority patent application No. 2003-142618, filed on May 20, 2003, the entire contents of which are hereby incorporated by reference.

What is claimed is:

1. A recording medium drive unit, comprising:
    an insertion part defining an insertion opening through which a recording medium is inserted;
    a holder configured to receive the recording medium inserted through the insertion opening;
    a connector;
    a holder drive part configured to move the holder to a loading position at which the recording medium is connected to the connector; and a clamp mechanism configured to be slidable on the holder, the clamp mechanism including an engagement member to be engaged with recesses on opposing sides of the recording medium as the recording medium is inserted into the holder, and to release engagement with the recesses as the holder moves in an ejection direction of the recording medium.

2. The recording medium drive unit as claimed in claim 1, wherein the engagement member comprises a first part engaged with the recess of one of the opposing sides of the recording medium and a second part engaged with the recess of another one of the opposing sides of the recording medium so that the recording medium is held between the first and second parts of the engagement member.

3. A recording medium drive unit, comprising:
an insertion part defining an insertion opening through which a recording medium is inserted;
a holder configured to receive the recording medium inserted through the insertion opening;
a connector;
a holder drive part configured to move the holder to a loading position at which the recording medium is connected to the connector; and
a clamp mechanism configured to be slidable on the holder, and to hold the recording medium as the recording medium is inserted into the holder,
wherein the holder drive part comprises:
a motor rotatable in forward and reverse directions;
a detection switch configured to detect insertion of the recording medium to a clamp position at which the recording medium is held by the clamp mechanism;
a transmission mechanism configured to transmit a rotational driving force of the motor to the holder; and
a control part configured to rotate the motor in a forward direction based on a detection signal output from the detection switch, and to stop forward rotation of the motor when the holder reaches the loading position.

4. The recording medium drive unit as claimed in claim 3, further comprising:
an ejection detection member detecting an ejection operation; and
an initial position detection part detecting that the holder is in an initial position,
wherein the control part rotates the motor in the reverse direction based on a signal output from the ejection detector member so that the recording medium is transported in an ejection direction to be ejected, the control part stopping rotating the motor based on the detection by the initial position detection part.

5. The recording medium drive unit as claimed in claim 4, wherein the control part controls voltage supplied to the motor, the control part applying high voltage to the motor and driving the holder in the ejection direction, the control part, after the recording medium is disconnected from the connector, constantly applying the high voltage to the motor so that the holder moves in the ejection direction.

6. The recording medium drive unit as claimed in claim 3, wherein the control part controls voltage supplied to the motor, the control part applying high voltage to the motor and moving the holder toward the loading position when the insertion of the recording medium into the holder is detected, the control part applying low voltage to the motor immediately before the recording medium is connected to the connector and moving the holder, the control part, after counting a predetermined period of time after starting applying the low voltage to the motor, applying the high voltage to the motor and moving the holder so that the recording medium is connected to the connector.

7. The recording medium drive unit as claimed in claim 3, wherein:
the holder is adapted so that each of a plurality of recording media having different sizes along the insertion direction is selectively insertable into the holder as the recording medium; and
the holder drive part, irrespective of the size of the recording medium inserted into the holder, rotates the motor and draws the recording medium to an inside of the recording medium drive unit, the holder drive part stopping rotating the motor when it is detected that an end of the recording medium in the insertion direction has moved to the loading position.

8. The recording medium drive unit as claimed in claim 3, further comprising:
a lid member closing the insertion opening; and
an opening and closing mechanism moving the lid member to a closing position to close the insertion opening or to an opening position to open the insertion opening as the holder moves,
wherein the opening and closing mechanism, when the recording medium is inserted, moves the lid member to the closing position in conjunction with movement of the holder toward the loading position if the recording medium is small in size in the insertion direction.

9. The recording medium drive unit as claimed in claim 8, wherein the opening and closing mechanism, when the recording medium is inserted, moves the lid member out of a medium transportation path through which the recording medium passes, and causes an end of the recording medium in an ejection direction opposite to the insertion direction to close the insertion opening if the recording medium is larger in size in the insertion direction.

10. The recording medium drive unit as claimed in claim 8, wherein the opening and closing mechanism opens the insertion opening by moving the lid member out of the medium transportation path when the motor is rotated in the reverse direction to move the holder in the ejection direction by an ejection operation.

11. The recording medium drive unit as claimed in claim 3, further comprising:
a lid member closing the insertion opening;
an opening and closing mechanism moving the lid member to a closing position to close the insertion opening to an opening position to open the insertion opening as the holder moves,
wherein: the opening and closing mechanism, when the recording medium is inserted, moves the lid member to the closing position in conjunction with movement of the holder toward the loading position if the recording medium has a first size in the insertion direction; and
the opening and closing mechanism, when the recording medium is inserted, moves the lid member out of a medium transportation path through which the recording medium passes, and causes an end of the recording medium in an ejection direction opposite to the insertion direction to close the insertion opening if the recording medium has a second size in the insertion direction, the second size being greater than the first size.

12. A recording medium drive unit, comprising:
an insertion opening through which a recording medium is inserted;
a holder receiving the recording medium inserted through the insertion opening;

a holder drive part moving the holder to a loading position or an initial position, wherein:

the holder is adapted to selectively receive, as the recording medium, each of a plurality of recording media having different sizes along an insertion direction in which the recording medium is inserted into the holder, and to have the recording medium attached to or detached from the holder substantially horizontally with respect to the holder; and when the holder is driven to the initial position by the holder drive part and ejects the recording medium to be in a stationary state, at least an end of the recording medium in an ejection direction opposite to the insertion direction is positioned to project from the insertion opening if the recording medium is one having the smallest size, and the recording medium projects from the insertion opening with such an amount of projection as to prevent the recording medium from falling off the holder if the recording medium is one having the largest size.

\* \* \* \* \*